US008520763B2

(12) United States Patent
Tajer et al.

(10) Patent No.: US 8,520,763 B2
(45) Date of Patent: Aug. 27, 2013

(54) ROBUST LINEAR PRECODER DESIGNS FOR MULTI-CELL DOWNLINK TRANSMISSION

(71) Applicant: NEC Laboratories America, Inc., Princeton, NJ (US)

(72) Inventors: Ali Tajer, Fort Lee, NJ (US); Narayan Prasad, Wyncote, NJ (US); Xiaodong Wang, New York, NY (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/650,477

(22) Filed: Oct. 12, 2012

(65) Prior Publication Data

US 2013/0034176 A1 Feb. 7, 2013

Related U.S. Application Data

(62) Division of application No. 12/878,258, filed on Sep. 9, 2010, now Pat. No. 8,385,454.

(60) Provisional application No. 61/240,769, filed on Sep. 9, 2009.

(51) Int. Cl.
*H04B 7/02* (2006.01)
*H04L 1/02* (2006.01)

(52) U.S. Cl.
USPC ........... 375/267; 375/299; 375/347; 455/101; 370/334

(58) Field of Classification Search
USPC .......... 375/347, 267, 299; 455/101; 370/334
See application file for complete search history.

(56) References Cited

U.S. PATENT DOCUMENTS

| | | | |
|---|---|---|---|
| 2009/0016312 A1* | 1/2009 | Tao et al. | 370/344 |
| 2011/0194516 A1* | 8/2011 | Aiba et al. | 370/329 |
| 2012/0163332 A1* | 6/2012 | Venturino et al. | 370/329 |

* cited by examiner

*Primary Examiner* — Ted Wang
(74) *Attorney, Agent, or Firm* — Joseph Kolodka

(57) ABSTRACT

Methods and systems for optimizing the utilities of receiver devices in a wireless communication network are disclosed. Precoder design formulations that maximize a minimum worst-case rate or a worst-case sum rate are described for both full base station cooperation and limited base station cooperation scenarios. In addition, optimal equalizers are also selected to optimize the worst-case sum rate.

20 Claims, 7 Drawing Sheets

ROBUST LINEAR PRECODER DESIGNS FOR MULTI-CELL DOWNLINK TRANSMISSION

RELATED APPLICATION INFORMATION

This application is a divisional of U.S. patent application Ser. No. 12/878,258, filed on Sep. 9, 2010, which in turn claims priority to U.S. Provisional Application No. 61/240,769, filed on Sep. 9, 2009, the content of which is incorporated herein by reference.

BACKGROUND

1. Technical Field

The present invention relates to optimizing the utility of devices in a wireless communication network and, more particularly, to the determination of precoders that optimize the network utility.

2. Description of the Related Art

The increasing demand for accommodating growing numbers of users within wireless networks has a tendency to limit the signal quality in such networks due to interference generated by serving a large number of users. A useful approach for mitigating the interference in downlink transmissions is to equip the base stations with multiple transmit antennas and employ transmit precoding. Such precoding exploits the spatial dimension to ensure that the signals intended for different users remain easily separable at their designated receivers. To enable precoded transmission, the base stations should acquire the knowledge of channel states or channel state information (CSI).

Many existing works have addressed the beamforming design problem by assuming that each base station communicates with its respective terminals independently. In such a framework, inter-cell interference is simply regarded as additional background noise and the design of the beamforming vectors is performed on a per-cell basis only. Other works assume that both data and channel state information of all users could be shared in real-time, so that all base stations can act as a unique large array with distributed antenna elements. These works employ joint beamforming, scheduling and data encoding to simultaneously serve multiple co-channel users. Moreover existing works also assume that the channel state information is perfectly known to the sources.

SUMMARY

Exemplary embodiments of the present invention enable the robust optimization of user-utilities by designing precoders that account for inter-cell interference between users of different cells and intra-cell interference between users in a common cell. Furthermore, exemplary embodiments can also consider channel states and corresponding uncertainty regions of channels received by users that are intended for other users in the same cell or in other cells to ensure that the designed precoders provide optimal utilities.

One exemplary embodiment is directed to a method for optimizing the utility of receiver devices in a wireless communication network. In the method, information indicative of channel states corresponding to channels received by a set of receiver devices can be obtained. In addition, a precoding matrix can be determined by maximizing, for the set of receiver devices, a utility estimate corresponding to a minimum receiver rate within a set of rates corresponding to a bounded set of channel estimation errors determined by considering a set of channels including channels received by the set of receiver devices from base stations other than a base station servicing the set of receiver devices. Further, beamforming signals generated in accordance with the determined precoding matrix can be transmitted to the receiver devices.

An alternative exemplary embodiment is drawn towards a method for optimizing the utility of receiver devices in a wireless communication network. The method may include obtaining information indicative of channel states of channels received by a set of receiver devices. Additionally, a precoding matrix can be determined by maximizing, for the set of receiver devices, a utility estimate corresponding to a minimum receiver weighted-sum rate within a set of rates corresponding to a bounded set of channel estimation errors determined by considering a set of channels including channels received by the set of receiver devices from base stations other than a base station servicing the set of receiver devices. Thereafter, beamforming signals generated in accordance with the determined precoding matrix can be transmitted to the receiver devices.

Another exemplary embodiment is directed to a system for optimizing the utility of receiver devices in a wireless communication network. The system may comprise a set of base stations that are configured to jointly apply a beamforming design to transmit beamforming signals to sets of receiver devices respectively served by the base stations. Here, a precoding matrix in the design for each base station can be determined by maximizing a utility estimate corresponding to a minimum receiver rate or a minimum receiver weighted-sum rate within a set of rates corresponding to a bounded set of channel estimation errors determined by considering a set of channels including channels received by the set of receiver devices from base stations other than a base station serving the set of receiver devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Exemplary embodiments of the present invention address the problem of designing beamforming vectors or beamformers for a multi-cell, multi-user wireless communication system. Coordinated information processing by the base stations of multi-cell wireless networks enhances the overall quality of communication in the network. Such coordinations for optimizing any desired network-wide quality of service (QoS) typically involve the acquisition and sharing of some channel state information (CSI) by and between the base stations. With perfect knowledge of channel states, the base stations can adjust their transmissions to achieve a network-wide QoS optimality. In practice, however, the CSI can be obtained only imperfectly. As a result, due to the uncertainties involved, the network is not guaranteed to benefit from a globally optimal QoS. Nevertheless, if the channel estimation perturbations are confined within bounded regions, the QoS measure will also lie within a bounded region. Therefore, by exploiting the notion of robustness in the worst-case sense, worst-case QoS guarantees for the network can be achieved and asserted.

Embodiments of the present invention described herein below can employ a model for noisy channel estimates that assumes that estimation noise terms lie within known hyper-spheres. Embodiments include linear transceivers that optimize a worst-case QoS measure in downlink transmissions. In particular, embodiments can maximize the worst-case weighted sum-rate of the network and the minimum worst-case rate of the network. Several centralized or fully cooperative and distributed (with limited cooperation) processes and systems, entailing different levels of complexity and information exchange among the base stations, described herein below can be employed to implement such transceiver designs.

Figure 1:
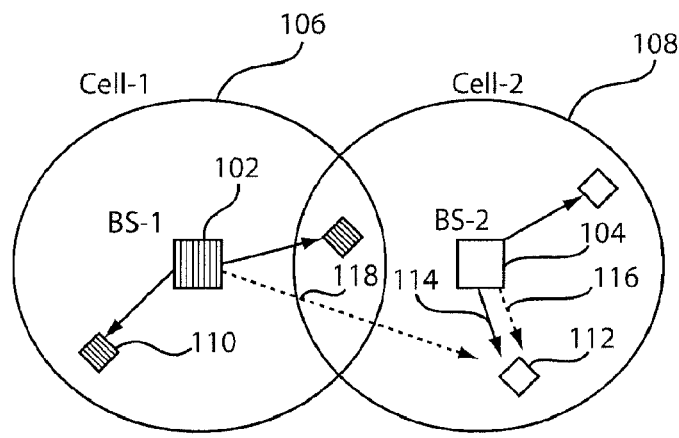
FIG. 1 is a block diagram of an exemplary network communication system exhibiting inter-cell and intra-cell interference.

Referring now in detail to the figures in which like numerals represent the same or similar elements and initially to FIG. 1, a portion of a wireless communication system 100 in which embodiments of the present invention can be implemented is illustrated. Each base-station (BS) or source 102, 104 servicing cells 106, 108, respectively, in the system 100 is modeled as having access to imperfect channel state information. All base stations can be equipped with multiple transmit antennas and each mobile user 110, 112 in the system can be equipped with a single receive antenna. Each base station in the system can employ linear beamforming to serve each one of its scheduled users or mobile devices on any resource slot. Here, each scheduled user is assumed to be served by only one base station. The association of each user to a particular base station (its serving base station) can be pre-determined. Further, each user can receive a useful (desired) signal 114 from its serving base station in addition to interference from its serving base station (116) as well as from adjacent base stations (118). The interference includes all signals transmitted in the same resource slot as the desired signal but which are intended for the other users. It should be understood that a resource slot can be a time, frequency and/or code slot.

Each BS or source in the system 100 has access to channel state information that can be limited in that it is not global and imperfect in that it is subject to errors. In addition, some side information about the nature of errors can be available and limited information exchange (signaling) between base-stations is possible. According to aspects of the present principles, beam vectors can be designed for a cluster or set of coordinating base stations based on a given set of channel estimates, which ensure a robust performance. For example, in the case that the errors lie in a bounded region, the designed beam vectors can maximize a utility that is guaranteed for all possible errors, whereas in the case that the errors are realizations drawn from known distributions, the designed beam vectors can maximize a utility under probabilistic guarantees. As understood by those of skill in the art, a utility measure can be based on and directly correlated to a minimum receiver rate or a weighted sum of receiver rates.

Figure 2:
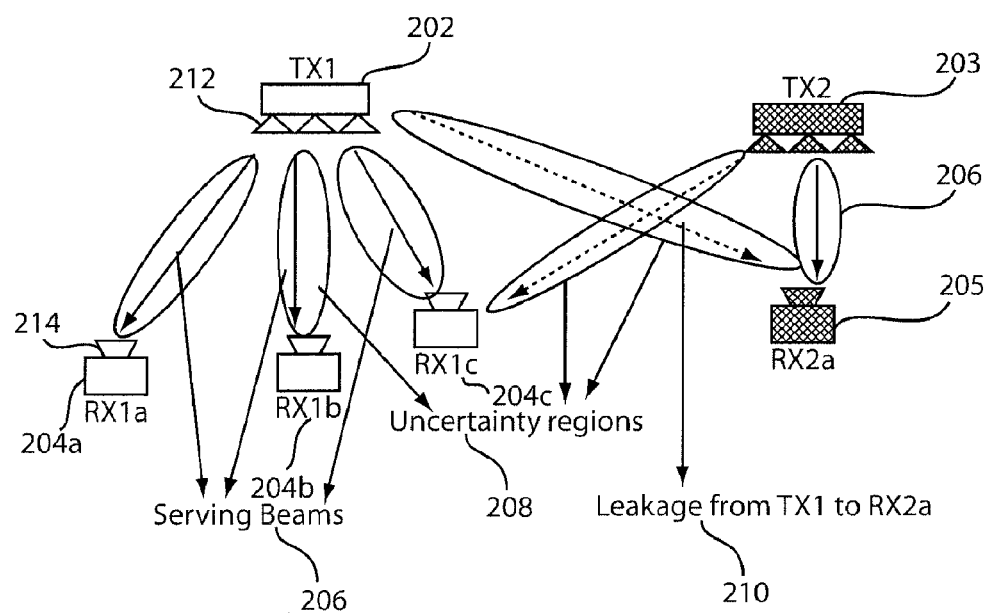
FIG. 2 is a block diagram of an exemplary network communication system exhibiting inter-cell and intra-cell interference and illustrating uncertainty regions of received channels.

FIG. 2 provides a more detailed system 200 in which embodiments can be implemented. As depicted in FIG. 2, all transmitters 202, 203 are equipped with multiple transmit antennas 212 and the users are each equipped with a single receive antenna 214. Every transmitter can be configured to employ linear beamforming to serve each one of its scheduled users. Each user, in turn, receives useful (desired) signals 206 from one transmitter and also receives interference 210 from its serving transmitter as well as adjacent transmitters. As noted above, the interference can include all signals, transmitted in the same resource slot as the desired signal but which are intended for other users.

Each transmitter or source in system 200 employs an estimate of each one of its "outgoing channels," which are the channels between a transmitter and all users. Each transmitter also employs an estimate of all the "incoming channels" seen by each one of the users served by it. In other words, the incoming channels are the channels seen by each served user from all transmitters. However, in practice, these estimates are imperfect. In particular, the true channel between any source and receiver is equal to the sum of the corresponding estimate and an error vector. According to exemplary aspects, the actual error vector is unknown to the source but the source is aware of the region, referred to as the uncertainty region, in which the error vector lies. In FIG. 2, the uncertainty regions are represented by ellipsoids 208. It should be noted that any reference to a "base station" herein can correspond to any one or more base stations in systems 100 and/or 200.

As indicated above, many existing works have addressed the beamforming design problem by assuming that each base station communicates with its respective terminals independently. Further, other works assume that both data and channel state information of all users could be shared in real-time, so that all base stations can act as a unique large array with distributed antenna elements and employ joint beamforming, scheduling and data encoding to simultaneously serve multiple co-channel users. In practice, however, only a much lower level of coordination among base stations is feasible and it is much more reasonable to assume that each user is served by only one base station. Moreover, as indicated above, existing works also assume that the channel state information is perfectly known to the sources, which unfortunately does not hold in practice.

Embodiments described herein apply to a more general model of multi-cell wireless networks, which hitherto has not been investigated for robust optimization, and treat the problem of joint robust transmission optimization for multiple or all cells. The significance of such multi-cell transmission optimization is that it incorporates the effects of inter-cell interferences, which are ignored when the cells optimize their transmissions independently. Furthermore, a practical constraint which forbids real-time data sharing among base stations can be incorporated so that each user can be served by only one base station.

Embodiments can design beam vectors for a cluster or set of coordinating transmitters (base stations) based on a given set of channel estimates and their uncertainty regions, which ensure a robust performance. In particular, the designed beam vectors can maximize a utility that is guaranteed for all possible errors within the respective uncertainty regions. For example, embodiments can design beam vectors by optimizing the worst-case weighted sum-rate or the minimum worst-case rate. For any given set of beams, user weights and channel estimates, the worst-case weighted sum-rate is the weighted sum-rate obtained when the errors assume their worst-possible values within the respective uncertainty regions. Thus, by maximizing the worst-case weighted sum-rate over the choice of beams, embodiments can obtain a robust choice of beam vectors that yields the best possible weighted sum-rate that is guaranteed for all possible errors within the respective uncertainty regions.

Transmission Model

A detailed transmission model is now provided to better illustrate aspects of the present principles. In the model, a multi-cell network includes M cells, where each cell has one base station that serves K users. The BSs are equipped with N transmit antennas and each user employs one receive antenna. $B_m$ denotes the BS of the $m^{th}$ cell and $U_m^k$ denotes the $k^{th}$ user in the $m^{th}$ cell for $m \in \{1, \ldots, M\}$ and $k \in \{1, \ldots, K\}$. Quasi-static flat-fading channels are assumed and the downlink channel from $B_n$ to $U_m^k$ is denoted by $h_{m,n}^k \in \mathbb{C}^{1 \times N}$.

Let $x_m = [x_m^1, \ldots, x_m^K]^T \in \mathbb{C}^{K \times 1}$ denote the information stream of $B_m$, intended for serving its designated users via spatial multiplexing. It can be assumed that $E[x_m x_m^H] = I$. Prior to transmission by $B_m$, the information stream $x_m$ is linearly processed by the precoding matrix $F_m \in \mathbb{C}^{N \times K}$. The $k^{th}$ column of $F_m$ is denoted by $w_m^k \in \mathbb{C}^{N \times 1}$, which is the beam carrying the information stream intended for user $U_m^k$. By defining $f_m^k \in \mathbb{C} \setminus \{0\}$ as the single-tap receiver equalizer deployed by $U_m^k$, the received post-equalization signal at $U_m^k$ is given by $$y_m^k \triangleq \frac{1}{f_m^k} \left( \sum_{n=1}^{M} h_{m,n}^k F_n x_n + z_m^k \right), \quad (1)$$

where $z_m^k : \mathcal{CN}(0,1)$ accounts for the additive white complex Gaussian noise. It can be assumed that the users deploy single-user decoders for recovering their designated messages while suppressing the messages intended for other users as Gaussian interference. Therefore, the signal to interference-plus-noise ratio (SINR) of user $U_m^k$ (with the optimal equalizer) is given by $$SINR_m^k \triangleq \frac{|h_{m,m}^k w_m^k|^2}{\sum_{l \neq k} |h_{m,m}^k w_m^l|^2 + \sum_{n \neq m} \sum_{l} |h_{m,n}^k w_m^l|^2 + 1}. \quad (2)$$

Also, $M\tilde{S}E_m^k$ is defined as the mean square-error (MSE) of user $U_m^k$ when it deploys the equalizer $f_m^k$ and is given by $$M\tilde{S}E_m^k \equiv E[|y_m^k - x_m^k|^2] \quad (3)$$
$$= \frac{1}{|f_m^k|^2} \left( |h_{m,m}^k w_m^k - f_m^k|^2 + \sum_{l \neq k} |h_{m,m}^k w_m^l|^2 + \sum_{n \neq m} \sum_{l} |h_{m,n}^k w_m^l|^2 + 1 \right)$$

$MSE_m^k$ is further defined as the MSE corresponding to the minimum mean-square error (MMSE) equalizer which minimizes the MSE over all possible equalizers, i.e., $$MSE_m^k \equiv \min_{f_m^k} M\tilde{S}E_m^k \quad (4)$$

It can be assumed that user $U_m^k$ knows its incoming channels, $\{h_{m,n}^k\}_{n=1}^{M}$, perfectly. In contrast, each BS is assumed to acquire only noisy estimates of such channels corresponding to its designated receivers, i.e., $B_m$ knows the channels $\{h_{m,n}^k\}_{k,n}$ imperfectly. $\hat{h}_{m,n}^k$ denotes the noisy estimate of the channel $h_{m,n}^k$ available at $B_m$ (and possibly other BSs via cooperation) and the channel estimation errors, which are unknown to the BSs, is defined as $$D_{m,n}^k \triangleq h_{m,n}^k - \hat{h}_{m,n}^k, \forall m,n \in \{1, \ldots, M\},$$
$$\text{and } \forall k \in \{1, \ldots, K\}. \quad (5)$$

It can be assumed that such channel estimation errors are bounded and confined within an origin-centered hyperspherical region of radius $\epsilon_{m,n}^k$, i.e., $\|D_{m,n}^k\|_2 \leq \epsilon_{m,n}^k$. It is also noted that all the results derived in the sequel can be readily extended to the case where the uncertainty regions are bounded hyper-ellipsoids. In the sequel, for any matrix A, $\|A\|_2$ is used to denote matrix A's Frobenius norm.

Problem Statement

Using the transmission model described above, a formal problem statement is now provided, which details the goal of optimizing network-wide performance measures through the design of precoding matrices $\{F_m\}$ and/or receiver equalizers $\{f_m^k\}$ achieved by various exemplary embodiments. Such optimization hinges on the accuracy of channel estimates available at the BSs. Due to the uncertainties about channels estimates, the notion of robust optimization in the worst-case sense is adopted. The solution of the worst-case robust optimization is feasible over the entire uncertainty region and provides the best guaranteed performance over all possible CSI errors.

Based on this notion of robustness, two rate optimization problems are considered. One pertains to maximizing the worst-case weighted sum-rate of the multi-cell network and the other one seeks to maximize the minimum worst-case rate in the network. Both optimizations are subject to individual power constraints for the BSs. Let $R_m^k$ denote the rate assigned to user $U_m^k$ and the power budget for the BS $B_m$ is denoted by $P_m$. Also, P is defined as the vector of power budgets, $P \triangleq [P_1, \ldots, P_M]$.

First the robust max-min rate problem, which aims to maximize the minimum worst-case rate of the network subject to the power budget P, is considered. Because the users can be assumed to deploy single-user decoders, $R_m^k$ can be defined in terms of the SINR of user $U_m^k$: $R_m^k = \log(1 + SINR_m^k)$. Therefore, the robust max-min rate problem can be posed as $$S(P) \triangleq \begin{cases} \max_{\{F_m\}} \min_{k,m} \min_{\{D_{m,n}^k\}} \text{SINR}_m^k \\ \text{s.t.} \quad \|F_m\|_2^2 \leq P_m \quad \forall m. \end{cases} \quad (6)$$

As the second problem, optimization of the worst-case weighted sum-rate of the network is considered. For a given set of positive weighting factors $\{\alpha_m^k\}$, where $\alpha_m^k$ is the weighting factor corresponding to the rate of user $U_m^k$, this problem is formalized as $$R(P) \triangleq \begin{cases} \max_{\{F_m\}} \min_{\{D_{m,n}^k\}} \sum_{m=1}^{M} \sum_{k=1}^{K} \alpha_m^k R_m^k \\ \text{s.t.} \quad \|F_m\|_2^2 \leq P_m \quad \forall m \end{cases} \quad (7)$$

Solving these problems yields the design of the precoder matrices. It should be noted that for a given set of precoders $\{F_m\}$ and channel realizations $\{h_{m,n}^k\}$, the MMSE equalization factors $\{f_m^k\}$ can be obtained in closed form.

It should also be noted that the joint design of the optimal precoders may involve having each BS acquire global CSI, which necessitates full cooperation (full CSI exchange) among the BSs. Such centralized processes are employed in certain exemplary embodiments described herein below with the assumption that such full cooperation is feasible. In practice, however, full cooperation might not be implementable. In such cases, distributed processes, also described herein below, that entail limited cooperation among the BSs can be employed. Some of the exemplary embodiments that utilize distributed processes yield the same performance as their centralized counterparts.

Robust Max-Min Rate Optimization

Figure 3:
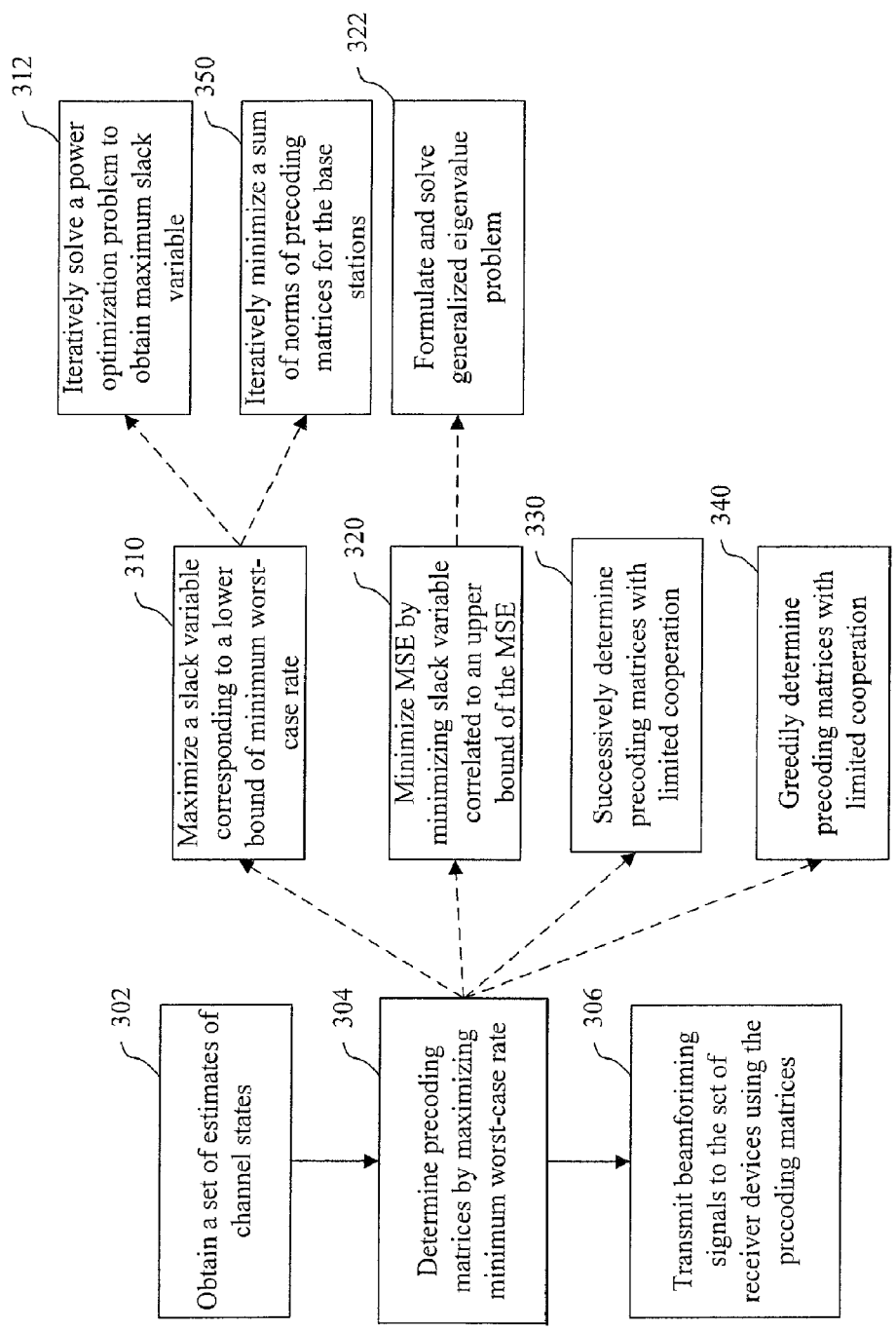
FIG. 3 is a block/flow diagram of an exemplary method for optimizing the utility of receiver devices in a wireless communication network by maximizing a worst-case minimum rate.

Referring now to FIG. 3 with continuing reference to FIGS. 1 and 2, a method 300 for optimizing the utility of receiver devices in a wireless communication system is illustrated. In particular, the method 300 generally implements a robust max-min rate optimization and can be performed in a variety of ways, as discussed further herein below. Method 300 can be performed by a base station 102, 202 or a control center, which may itself be a designated base station 102, 202, if full cooperation between base stations is feasible. Alternatively, if only limited cooperation is feasible, then the method can be performed independently by each base station, as discussed further herein below.

The method 300 may begin at step 302 in which a base station or a control center may obtain a set of estimates of channel states corresponding to channels received by a set of receiver devices. These estimates can be received in the form of feedback from the receiver devices. The feedback from each receiver device can be limited to a few bits. Thus, each receiver device may have to quantize each one of the channel estimates available to it. Consequently, the base station or control center may have access to channel estimates that are corrupted by quantization errors. As indicated above, the channel state information may correspond to $\{h_{m,n}^k\}_{n=1}^M$, which includes the channel $h_{m,m}^k$ received by the receiver from the base station $B_m$ servicing the receiver in addition to the channels $h_{m,n}^k$ ($n \neq m$) received by the receiver from base stations $B_n$ servicing cells other than cell m. In a fully cooperative scenario, each base station may communicate the respective channel state information for receivers or users in the corresponding cell to the other base stations in the network or to a control center. Alternatively, in a limited cooperation scenario, while each base station can obtain channel information $\{h_{m,n}^k\}_{n=1}^M$ for receivers in its own cell, each base station can communicate prospective precoding matrices to other bases to optimize receiver utility in the network, as discussed in more detail herein below.

At step 304, a base station or control center can determine a precoding matrix for the set of receiver devices by maximizing a minimum worst case rate of the network. For example, as discussed above with regard to equation (6), the precoding matrices $\{F_m\}$ for the base stations in the network can be determined in accordance with a power budget by solving the following:

$$S(P) \triangleq \begin{cases} \max_{\{F_m\}} \min_{k,m} \min_{\{D_{m,n}^k\}} \text{SINR}_m^k \\ \text{s.t.} \quad \|F_m\|_2^2 \leq P_m \quad \forall m. \end{cases}$$

As noted above, $R_m^k = \log(1+\text{SINR}_m^k)$. Thus, for base station m, the term $$\min_{k,m} \min_{\{D_{m,n}^k\}} \text{SINR}_m^k$$

is an example of a utility estimate corresponding to the minimum receiver rate $$\min_{k,m} R_m^k$$

within a set of rates corresponding to a bounded set of channel estimation errors $\{D_{m,n}^k\}$. Furthermore, the estimate can be determined by considering a set of channels $\{h_{m,n}^k\}_{n=1}^M$ including channels $h_{m,n}^k$ ($n \neq m$) received by the set of receiver devices from base stations $B_n$ ($n \neq m$) other than a base station $B_m$ servicing the set of receiver devices. For example, as noted above and below with respect to various exemplary embodiments, $\{h_{m,n}^k\}_{n=}^M$ can be used to determine values of $\text{SINR}_m^k$ to solve equation (6).

It should be noted that, at step 304, in the full cooperation scenario, the control center can determine precoding matrices for each base station using channel state information for receivers in each cell serviced by the base stations and can assign the precoding matrices to the base stations to enable them to generate optimized, beamforming signals for transmission to the receiver. Alternatively, in the full cooperation scenario, each base station may independently determine their own precoding matrix using the same methods, where each base station can receive channel state information from each other base station, determine the precoding matrices for the entire network and apply the precoding matrix. Various exemplary embodiments that can be employed to implement step 304 are discussed further herein below.

At step 306, each base station can transmit beamforming signals generated in accordance with the determined precoding matrix to their own respective receiver devices in their respective cell.

Returning to step 304, one or more base stations can implement step 304 by solving equation (6) via power optimization or via MSE optimization. To better illustrate how embodiments can implement the power optimization approach, a solution to equation (6) is presented in which each base station is assumed to serve only one user in its respective cell.

Single-User Cells (K=1)

Under the assumption that each BS is serving one user, i.e., K=1, the downlink transmission model essentially becomes equivalent to a multi-user Gaussian interference channel with M transmitters and M respective receivers. For the ease of notation the superscript k is omitted in the subsequent analysis and discussions with regard to single-user cells. When K=1 the precoder of BS $B_m$ consists of only one column vector which is referred to by $w_m$. For the given channel estimates $\{\tilde{h}_{m,n}\}$, $\text{sinr}_m$ is defined as $\text{sinr}_m \triangleq \min_{\{D_{m,n}\}} \text{SINR}_m$ as the worst-case (smallest) $\text{SINR}_m$ over the uncertainty regions.

By introducing a slack variable a>0, the epigraph form of the robust max-min rate optimization problem S(P) given in (6) is given by $$S(P) = \begin{cases} \max_{\{w_m\},a} & a \\ \text{s.t.} & \text{sinr}_m \geq a \quad \forall m, \\ & \|w_m\|_2^2 \leq P_m \quad \forall m. \end{cases} \quad (8)$$

The closed-form characterization of $\text{sinr}_m$ can be found by recalling (2) to obtain $$\text{sinr}_m = \min_{\{D_{m,n}\}} \frac{|h_{m,m}w_m|^2}{\sum_{n \neq m} |h_{m,n}w_n|^2 + 1} \quad (9)$$

$$= \frac{\min_{D_{m,n}} |h_{m,m}w_m|^2}{\sum_{n \neq m} \max_{D_{m,n}} |h_{m,n}w_n|^2 + 1},$$

where the second equality holds by noting that finding the worst-case $\text{SINR}_m$ can be decoupled into finding the worst-case (smallest) numerator term and the worst-case (largest) denominator terms. In order to further simplify $\text{sinr}_m$, the result of the following lemma can be used. The proof is omitted for brevity purposes.

Lemma 1 For any given $h \in \mathbb{C}^{1 \times N}$, $w \in \mathbb{C}^{N \times 1}$, $\epsilon \in \mathbb{R}^+$, and positive definite matrix Q; $g_{min}$ and $g_{max}$ defined as $$g_{min} \triangleq \begin{cases} \min_x & |hw + xw|^2 \\ \text{s.t.} & \sqrt{xQx^H} \leq \epsilon, \end{cases} \text{ and }$$

$$g_{max} \triangleq \begin{cases} \max_x & |hw + xw|^2 \\ \text{s.t.} & \sqrt{xQx^H} \leq \epsilon, \end{cases}$$

are given by $$g_{min} = |(|hw| - \epsilon\sqrt{w^H Q^{-1} w})^+|^2, \text{ and } g_{max} = ||hw| + \epsilon\sqrt{w^H Q^{-1} w}|^2,$$

where $(x)^+ = \max\{0,x\}$, $\forall x \in \mathbb{R}$.

By recalling (9) and invoking the result of the Lemma 1 for the choice of Q=I, $\text{sinr}_m$ can be further simplified as $$\text{sinr}_m = \frac{|(|\tilde{h}_{m,m}w_m| - \epsilon_{m,m}\|w_m\|_2)^+|^2}{\sum_{n \neq m} ||\tilde{h}_{m,n}w_n| - \epsilon_{m,n}\|w_n\|_2|^2 + 1}. \quad (10)$$

The relevant scenarios are where $\forall m$, $\|\tilde{h}_{m,m}\|_2 \geq \epsilon_{m,m}$, so that S(P)>0. Given the closed-form characterization of $\text{sinr}_m$, solving S(P) can be facilitated by solving a power optimization problem defined as $$P(P,a) \triangleq \begin{cases} \min_{\{w_m\},b} & b \\ \text{s.t.} & \text{sinr}_m \geq a \quad \forall m, \\ & \frac{\|w_m\|_2}{\sqrt{P_m}} \leq b \quad \forall m \end{cases} \quad (11)$$

The connection between S(P) and P(P,a) is established in the following useful theorem. The proof is simple and hence omitted for brevity.

Theorem 1 For any given power budget P, P(P,a) is strictly increasing and continuous in a at any strictly feasible a and is related to S(P) via $$P(P,S(P))=1.$$

Strict monotonicity and continuity of P(P,a) in a at any strictly feasible a provides that there exists a unique a* satisfying P(P,a*)=1. Hence, taking into account Theorem 1 establishes that S(P) can be solved by finding a* that satisfies P(P,a*)=1. Due to monotonicity and continuity of P(P,a), finding a* can be implemented via a simple iterative bi-section search. Each iteration involves solving P(P,a) for a different value of a. P(P,a) can be cast as a convex problem with a computationally efficient solution.

Theorem 2 Problem P(P,a) can be posed as a semidefinite programming (SDP) problem.

The proof is omitted for brevity purposes.

To employ such a procedure for solving S(P), the BSs should be fully cooperative such that each BS can acquire estimates of all network-wide channel states.

Multi-User Cells (K>1)

Downlink transmissions serving more than one user in each cell (K>1) are now considered. The major difference between the analysis for multiuser cells and that of single-user cells arises from different characterizations of their corresponding worst-case SINRs. By defining $\text{sinr}_m^k$ as the worst-case $\text{SINR}_m^k$ in (2), $\text{sinr}_m^k$ is obtained as $$\text{sinr}_m^k = \min_{\{D_{m,n}^k\}} \frac{|h_{m,m}^k w_m^k|^2}{\sum_{l \neq k} |h_{m,m}^k w_m^l|^2 + \sum_{n \neq m}\sum_l |h_{m,n}^k w_n^l|^2 + 1}. \quad (12)$$

Unlike the single-user setup, when K>1, the uncertainty regions of the numerator and the summands of the denominator of $\text{sinr}_m^k$ are not decoupled. Therefore, finding $\text{sinr}_m^k$ cannot be decoupled into finding the worst-case numerator and the terms in the denominator independently. To the knowledge of the inventors, handling constraints on such worst-case SINRs even in single-cell downlink transmissions is not mathematically tractable and the robust design of linear precoders for these systems is carried out suboptimally. In the sequel suboptimal approaches are also proposed for solving the robust max-min rate optimization in multi-cell networks.

Two suboptimal approaches can be employed for solving S(P). In the first approach, a lower bound on the worst-case SINR is found and, in the formulation of S(P), each worst-case SINR is replaced with its corresponding lower bound. Similar to the single-user cells setup discussed above, this approximate problem can be solved efficiently through solving a counterpart power optimization problem. In the second approach, the robust max-min rate optimization problem can be converted into a robust min-max MSE optimization problem and an upper bound on the maximum worst-case MSE, which in turn provides a lower bound on the minimum worst-case rate, can be found. Each approach is described herein below.

Solving Via Power Optimization

Returning to method 300, exemplary embodiments can determine the precoding matrices at step 304 by maximizing, at step 310, a slack variable corresponding to a lower bound of an estimate corresponding to the minimum worst-case receiver rate under a power constraint. For example, the worst-case value of $SINR_m^k$, which is denoted by $sinr_m^k$, is not mathematically tractable. Consequently, to solve (6), lower bounds on the worst-case SINR s are found as follows. $\overline{sinr}_m^k$ is defined as $$\overline{sinr}_m^k \triangleq \frac{\min_{D_{m,m}^k} |h_{m,m}^k w_m^k|^2}{\max_{D_{m,m}^k} \sum_{l \neq k} |h_{m,m}^k w_m^l|^2 + \sum_{n \neq m} \max_{D_{m,n}^k} \sum_{l} |h_{m,n}^k w_n^l|^2 + 1},$$

where, clearly, $\overline{sinr}_m^k \leq sinr_m^k$. By applying Lemma 1, $$\overline{sinr}_m^k = \frac{|(|\tilde{h}_{m,n}^k w_m^k| - \varepsilon_{m,m}^k \|w_m^k\|_2)^+|^2}{\max_{D_{m,m}^k} h_{m,m}^k Y_{m,k}(Y_{m,k})^H (h_{m,m}^k)^H + \sum_{n \neq m} \max_{D_{m,n}^k} h_{m,n}^k F_n(F_n)^H (h_{m,n}^k)^H + 1}, \quad (13)$$

where $Y_{m,k}$ is defined as $Y_{m,k} \triangleq [w_m^1 \ldots, w_m^{k-1}, w_m^{k+1}, \ldots, w_m^K]$.

By introducing the slack variable a and invoking the lower bounds on the SINRs given in (13), a lower bound on the robust max-min rate is obtained as follows:

$$S_1(P) \equiv \begin{cases} \max_{\{F_m\},a} & a \\ \text{s.t. } \overline{sinr}_m^k \geq a & \forall m, k, \\ \|F_m\|_2^2 \leq P_m & \forall m \end{cases} \quad (14)$$

To maximize the slack variable in step 304, the base station can, at step 312, iteratively solve a power optimization problem to obtain a value of the slack variable that solves the slack variable maximization problem by determining whether slack variable values result in a pre-determined solution of the power optimization problem that is correlated to the solution to the slack variable maximization problem. For example, similar to the single-user scenario discussed above, solving $S_1(P)$ can be carried out by alternatively solving a power optimization problem in conjunction with a linear bi-section search. The power optimization of interest with per BS power constraints is given by $$P_1(P, a) \triangleq \begin{cases} \max_{\{F_m\},b} & b \\ \text{s.t. } \overline{sinr}_m^k \geq a & \forall m, k, \\ \frac{\|F_m\|_2}{\sqrt{P_m}} \leq b & \forall m \end{cases} \quad (15)$$

The result in Theorem 1 can be extended for a multiuser cell setup (K>1) in order to establish the connection $S_1(P)$ and $P_1(P,a)$. The proof is simple and is omitted for brevity.

Theorem 3 For any given power budget P, $P_1(P,a)$ is strictly increasing and continuous in a at any strictly feasible a and is related to $S_1(P)$ via $$P_1(P, S_1(P)) = 1. \quad (16)$$

Algorithm 1 of Table 1 below solves $S_1(P)$ by solving $P_1(P,a)$ combined with a bi-section line search. The optimality of Algorithm 1 and its convergence follows from the monotonicity and continuity of $P_1(P,a)$ at any feasible a. Similar to Theorem 2, it can be shown that $P_1(P,a)$ has a computationally efficient solution.

Theorem 4 Problem $P_1(P,a)$ can be posed as an SDP problem.

The proof of Theorem 4 is also omitted for brevity purposes.

It should be noted that when K=1, $S_1(P)$ is identical to S(P) and an optimal solution to the latter problem is obtained using Algorithm 1.

TABLE 1

Algorithm 1 - Robust Max-Min SINR Optimization via Power Optimization (K ≧ 1)

Figure 4:
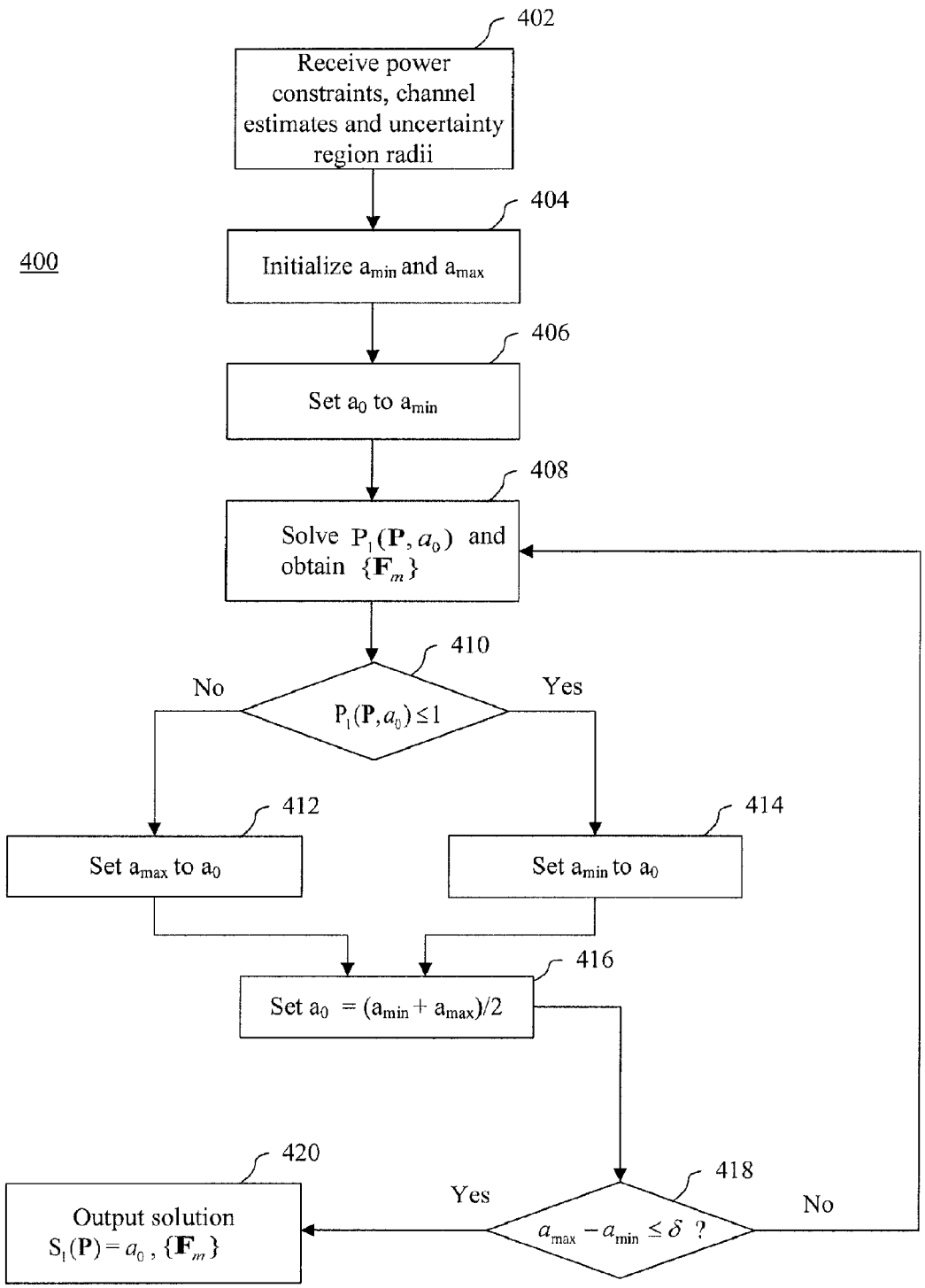
FIG. 4 is a block/flow diagram of an exemplary method for determining precoding matrices in accordance with a robust minimum rate optimization scheme in a full base station cooperation scenario.

1: Input P and $\{\tilde{h}_{m,n}^k, \varepsilon_{m,n}^k\}$
2: Initialize $a_{min} = 0$ and $a_{max} = \min_{m,k}\{P_m|(\|\tilde{h}_{m,n}^k\|_2 - \varepsilon_{m,n}^k)^+|^2\}$
3: $a_0 \leftarrow a_{min}$
4: Repeat
5: Solve $P_1(P,a_0)$ and obtain $\{F_m\}$
6: if $P_1(P,a_0) \leq 1$
7: $a_{min} \leftarrow a_0$
8: Else
9: $a_{max} \leftarrow a_0$
10: end if
11: $a_0 \leftarrow (a_{min} + a_{max})/2$
12: until $a_{max} - a_{min} \leq \delta$
13: Output $S_1(P) = a_0$ and $\{F_m\}$ Referring now to FIG. 4, with continuing reference to FIG. 3 and Table 1, a detailed method 400 for maximizing the slack variable by solving a power optimization problem in step 312 according to an exemplary embodiment is illustrated. It should be noted that Algorithm 1 of Table 1 can be implemented in the method 400.

Method 400 can begin at step 402 in which the power constraint P, the channel estimates $\{\tilde{h}_{m,n}^k\}$ available at the base stations in the network and their corresponding uncertainty region radii $\{\varepsilon_m^k\}$ can be input or received by a base station. Here, the power constraint P can be selected in accordance with design choice and base station capabilities while the channel estimations $\tilde{h}_{m,n}^k$, for example, can be obtained as quantized feedback from receiver devices as discussed above with respect to step 302 and can be communicated between the base stations.

At step 404, the base station can initialize $a_{min}$ and $a_{max}$: $a_{min}=0$ and $$a_{max} = \min_{m,k} \left\{ P_m \left| \left( \|\tilde{h}_{m,n}^k\|_2 - \varepsilon_{m,m}^k \right)^+ \right|^2 \right\}.$$

At step 406, the base station can set $a_0$ to $a_{min}$.

At step 408, the base station can solve $P_1(P, a_0)$ using (15) with $a_0$ to obtain a prospective preceding matrix $\{F_m\}$.

At step 410, the base station can deter nine whether the value $a_0$ of the slack variable a results in a pre-determined solution of the power optimization problem that is correlated to the solution to the slack variable maximization problem. For example, as noted above $P_1(P,a)$ is related to $S_1(P)$ via $P_1(P,S_1(P))=1$, where the pre-determined solution here is 1. Thus, the base station may determine whether $P_1(P,a_0)\leq 1$. If $P_1(P,a_0)\leq 1$, then the method may proceed to step 414 in which the base station can set $a_{min}$ to $a_0$. Otherwise, the method may proceed to step 412, in which the base station can set $a_{max}$ to $a_0$.

Thereafter, the method may proceed to step 416, in which the base station can set $a_0 = (a_{min} + a_{max})/2$. Next, the method may proceed to step 418 in which the base station may determine whether $a_{max} - a_{min} \leq \delta$ for some $\delta$, which is selected based on design choice. If $a_{max} - a_{min} \leq \delta$, then the method may end at step 420, in which the base station may obtain the solution to the power optimization problem as $S_1(P) = a_0$ and $\{F_m\}$. Otherwise, the method may proceed to step 408 and repeat.

Solving Via MSE Optimization

As an alternative to solving via power optimization, the precoding matrices may be determined using MSE optimization. For example, in method 300 of FIG. 3, exemplary embodiments can determine the precoding matrices at step 304 by minimizing, at step 320, a maximum mean square error within a set of mean square errors corresponding to the bounded set of channel estimation errors. Further, the minimization of the MSE can be implemented by minimizing a slack variable correlated to an upper bound of the mean square error. For example, the robust max-min rate optimization problem can be transformed into a robust min-max MSE optimization problem by using the fact that $$MSE_m^k = \frac{1}{1+SINR_m^k},$$

where, as indicated above, $MSE_m^k$ is the MSE of user $U_m^k$ when it deploys the MMSE equalizer. Consequently, the worst-case MSE corresponding to the worst-case SINR is given as $$\max_{\{D_{m,n}^k\}} MSE_m^k = \frac{1}{1+\min_{\{D_{m,n}^k\}} SINR_m^k} = \frac{1}{1+sinr_m^k}. \quad (17)$$

Here, the term $$\max_{\{D_{m,n}^k\}} MSE_m^k$$

corresponds to the maximum mean square error within a set of mean square errors corresponding to a bounded set of channel estimation errors $\{D_{m,n}^k\}$. In addition, by recalling the problem S(P) given in (6) and taking into account the representation of $MSE_m^k$ given in (4) and the worst-case MSE given in (17), the robust max-min rate optimization problem can be solved by equivalently solving $$S_2(P) \equiv \begin{cases} \min_{\{F_m\}} \max_{k,m} \max_{\{D_{m,n}^k\}} \min_{f_m^k} M\tilde{S}E_m^k \\ \text{s.t. } \|F_m\|_2^2 \leq P_m \ \forall \ m. \end{cases} \quad (18)$$

An upper bound on $S_2(P)$, which in turn results in a lower bound on S(P), can be found and employed to facilitate solving (18). By invoking the inequality $$\max_{\{D_{m,n}^k\}} \min_{f_m^k} M\tilde{S}E_m^k \leq \min_{f_m^k} \max_{\{D_{m,n}^k\}} M\tilde{S}E_m^k \quad (19)$$

and introducing the slack variable $a \in R^+$, the following upper bound $\bar{S}_2(P)$ on $S_2(P)$ can be obtained as follows:

$$\bar{S}_2(P) \equiv \begin{cases} \min_{\{F_m, f_m^k\}, a} a \\ \text{s.t. } \max_{\{D_{m,n}^k\}} M\tilde{S}E_m^k \leq a^2 \ \forall \ k, m, \\ \|F_m\|_2^2 \leq P_m \ \forall \ m \end{cases} \quad (20)$$

It should be noted that the base station can implement the MSE minimization at step 320 by formulating and solving, at step 322, a generalized eigenvalue problem (GEVP). It is shown herein below that the problem in (20) is equivalent to a generalized eigenvalue problem (GEVP) which can be solved efficiently.

Theorem 5 The problem $\bar{S}_2(P)$ can be optimized efficiently as a GEVP.

Theorem 5 can be proven as follows. By recalling (3) and further defining the slack variables $\{b_{m,n}^k\}$, the constraints $(M\tilde{S}E_m^k \leq a^2)$ can be equivalently presented as follows.

$$\begin{cases} \sqrt{\sum_n (b_{m,n}^k)^2 + 1} \leq f_m^k a & \forall \ m, k \\ \|h_{m,m}^k F_m - f_m^k e_k\|_2 \leq b_{m,m}^k & \forall \ m, k, \forall \ \|D_{m,m}^k\|_2 \leq \varepsilon_{m,m}^k, \\ \|h_{m,n}^k F_n\|_2 \leq b_{m,n}^k & \forall \ k, m \neq n, \forall \ \|D_{m,n}^k\|_2 \leq \varepsilon_{m,n}^k, \end{cases}$$

where $e_k$ denotes a length K unit vector having a one in its $k^{th}$ position and zeros elsewhere. Without loss of generality, we have assumed $f_m^k \in R^+$ as multiplying the vectors $w_k^m$ with any unit-magnitude complex scalar will not change the objective or the constraints of the problem $\bar{S}_2(P)$. Next, by applying the Schur Complement lemma the constraints $\|h_{m,m}^k F_m - f_m^k e_k\|_2 \leq b_{m,m}^k$ for all $\|D_{m,m}^k\|_2 \leq \varepsilon_{m,m}^k$, can be equivalently stated as $$\begin{bmatrix} b_{m,m}^k & (\tilde{h}_{m,m}^k + D_{m,m}^k)F_m - f_m^k e_k \\ (F_m)^H(\tilde{h}_{m,m}^{k,k} + D_{m,m}^k)^H - f_m^k e_k^H & b_{m,m}^k I \end{bmatrix} \pm 0,$$

$$\forall \|D_{m,m}^k\|_2 \le \varepsilon_{m,m}^k,$$

which are equivalently given by $$T_m^k \triangleq \begin{bmatrix} b_{m,m}^k - \lambda_{m,m}^k & \tilde{h}_{m,m}^k F_m - f_m^k e_k & 0 \\ (F_m)^H(\tilde{h}_{m,m}^k)^H - f_m^k e_k^H & b_{m,m}^k I & -\varepsilon_{m,m}^k (F_m)^H \\ 0 & -\varepsilon_{m,m}^k F_m & \lambda_{m,m}^k I \end{bmatrix} \pm 0 \ \forall \ m, k.$$

Similarly it can be shown that the constraints $\|h_{m,n}^k F_n\|_2 \le b_{m,n}^k$ holding for all $\|D_{m,n}^k\|_2 \le \varepsilon_{m,n}^k$ are equivalently given by $$U_{m,n}^k \triangleq \begin{bmatrix} b_{m,n}^k - \lambda_{m,n}^k & \tilde{h}_{m,n}^k F_n & 0 \\ (F_n)^H(\tilde{h}_{m,n}^k)^H & b_{m,n}^k I & -\varepsilon_{m,n}^k (F_n)^H \\ 0 & -\varepsilon_{m,n}^k F_n & \lambda_{m,n}^k I \end{bmatrix} \pm 0 \forall m \ne n, k.$$

Finally, it is noted that the constraint $\sqrt{\sum_n (b_{m,n}^k)^2 + 1} \le f_m^k a$ is equivalent to $V_m^k + f_m^k a I \pm 0, \forall m, k$, where $$V_m^k \triangleq \begin{bmatrix} 0 & b_m^k & 1 \\ (b_m^k)^H & 0 & 0 \\ 1 & 0 & 0 \end{bmatrix}, \forall m, k.$$

Consequently, the problem $\bar{S}_2(P)$ is equivalent to $$\begin{cases} \min_{\{F_m, f_m^k\}, b, \lambda, a} a \\ \text{s.t. } V_m^k + f_m^k a I \pm 0 \forall m, k \\ T_m^k \pm 0, \forall k, m, \\ U_{m,n}^k \pm 0, \forall m \ne n, k \\ \|F_m\|_2^2 \le P_m \forall m, \end{cases}$$

which is a standard form of GEVP.

Limited Cooperation

In certain embodiments, distributed methods can be employed for networks that do not support full CSI exchange between the BSs. One such distributed method is denoted as Algorithm 2 and is provided herein below in Table 2. Algorithm 2 can be utilized in a network in which limited information exchange between the BSs is employed. Here, each BS can design its precoders independently of others. The cost incurred for enabling such distributed processing is the degraded performance compared with the centralized processes discussed herein above.

TABLE 2

Algorithm 2 - Distributed Robust Max-Min SINR Optimization

1: for m = 1, . . . , M do
2:    Input $P_m$

TABLE 2-continued

Algorithm 2 - Distributed Robust Max-Min SINR Optimization

3:    $B_m$ initializes $F_m = \frac{P_m}{K}\left[\frac{(\tilde{h}_{m,m}^1)^H}{\|\tilde{h}_{m,m}^1\|_2}, \ldots, \frac{(\tilde{h}_{m,m}^K)^H}{\|\tilde{h}_{m,m}^K\|_2}\right]$ and broadcasts $W_m = F_m F_m^H$
4: end for
5: Using $F_m, \{W_n\}_{n \ne m}$, each $B_m$ computes $\overline{\text{sinr}}_m^l, \forall l$
6: Repeat
7:    for m = 1, . . . , M do
8:      $B_m$ solves $S_{1,m}(P)$ and obtains $F_m^*$;
9:      $B_m$ broadcasts $W_m^* = F_m^*(F_m^*)^H$
10:      Each $B_n$, n ≠ m, computes $\overline{\text{sinr}}_n^{l*}, \forall l$ based on $W_m^*, F_n$ and $\{W_j\}_{j \ne m, n}$
11:      if $\min_l\{\overline{\text{sinr}}_n^{l*}\} < \min_l\{\overline{\text{sinr}}_n^l\}$ then $B_n$ sends an error message to $B_m$
12:      if $B_m$ receives no error message then it sets $F_m \leftarrow F_m^*$ and broadcasts an update message
13:      Upon receiving the update message each $B_n$, n ≠ m, sets $W_m \leftarrow W_m^*$ and updates $\overline{\text{sinr}}_n^l, \forall l$
14:    end for
15: until no further precoder update is possible
16: Output $\{F_m\}$ An underlying notion of the distributed algorithm in Table 2 is to successively update the precoder of one BS at-a-time while keeping the rest unchanged. More specifically, at the $m^{th}$ iteration, all precoders $\{F_n\}_{n \ne m}$ are fixed and only BS $B_m$ updates its precoder by maximizing the worst-case smallest rate of the $m^{th}$ cell. By recalling (14), the optimization problem solved by $B_m$ is given by $$S_{1,m}(P) \triangleq \begin{cases} \max_{F_m, a} a & (21) \\ \text{s.t. } \overline{\text{sinr}}_m^k \ge a \forall k \\ \|F_m\|_2^2 \le P_m \\ F_n \text{ are fixed for } n \ne m \end{cases}$$

Similar to the approach discussed above with regard to solving via power optimization, it can be readily verified that $S_{1,m}(P)$ can be solved through the following power optimization problem, $$P_{1,m}(P, a) \triangleq \begin{cases} \min_{F_m, b} b & (22) \\ \text{s.t. } \overline{\text{sinr}}_m^k \ge a \forall k \\ \frac{\|F_m\|_2}{\sqrt{P_m}} \le b \forall m, \\ F_n \text{ are fixed for } n \ne m \end{cases}$$

which is connected to the original problem $S_{1,m}(P)$ as follows.

Corollary 1 For any given power budget P, $P_{1,m}(P,a)$ is strictly increasing and continuous in a at any strictly feasible a and is related to $S_{1,m}(P)$ via $$P_{1,m}(P, S_{1,m}(P)) = 1 \text{ for } m = 1, \ldots, M. \quad (23)$$

To compute $\overline{\text{sinr}}_m^k$ in (13), it is clear that $B_m$ needs to know $W_n = F_n F_n^H$, n≠m. Using $\{W_n\}$, $B_m$ can solve $S_{1,m}(P)$ optimally and obtains $F_m^*$ through solving $P_{1,m}(P,a)$ in conjunction with a linear bi-section search, as shown above in line 8 of Algorithm 2. It should be noted that solving $S_{1,m}(P)$ optimizes the minimum worst-case rate locally in the $m^{th}$ cell and does not necessarily lead to a boost in the network utility function. As a result, in an exemplary embodiment, $B_m$ is permitted to update its precoder to $F_m^*$ only if such update results in a network-wide improvement, as shown in lines 9-13 of Algorithm 2.

The successive updates of the precoders can continue until no precoder can be further updated unilaterally. The convergence to such point is guaranteed by noting that Algorithm imposes the constraint that $B_m$ update its precoder only if it results in network-wide improvement.

Figure 5:
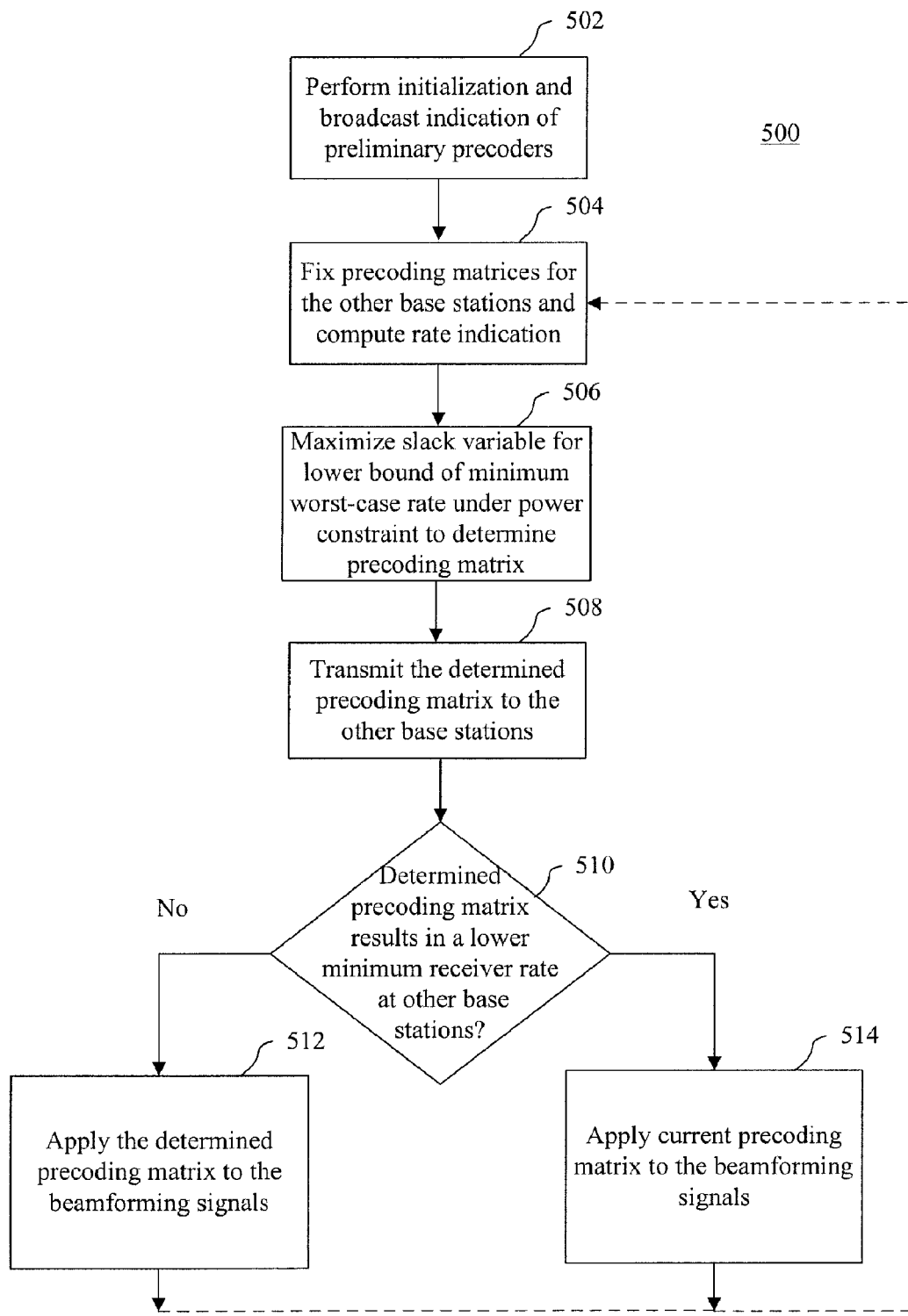
FIG. 5 is a block/flow diagram of an exemplary method for successively determining precoding matrices in accordance with a robust minimum rate optimization scheme in a limited base station cooperation scenario.

Referring now to FIG. 5 with continuing reference to FIG. 3, a base station may determine a precoding matrix at step 304 by implementing a method 500 for successively determining matrices in a network in which base stations have limited cooperation. Algorithm 2 described above can be employed in the method 500, which in turn can be performed at each base station. The method 500 may begin at step 502 in which the base station can perform initialization and can broadcast an indication of the preliminary precoding matrix. For example, as indicated above in Table 2, the base station $B_m$ may employ a power constraint $P_m$ as an input. Further, the base station $B_m$ can initialize its precoder matrix $F_m$ as $$F_m = \frac{P_m}{K}\left[\frac{(\tilde{h}_{m,m}^1)^H}{\|\tilde{h}_{m,m}^1\|_2}, \ldots, \frac{(\tilde{h}_{m,m}^K)^H}{\|\tilde{h}_{m,m}^K\|_2}\right]$$

and can broadcast $W_m = F_m F_m^H$. The base station can obtain the estimated channels as discussed above with respect to step 302 to compute the preliminary precoder matrix $F_m$.

At step 504, the base station can fix the precoding matrices for the other base stations in the network and can compute a rate indication for users in its cell. For example, each other base station can perform the initialization and can broadcast indications of precoders for its estimated channels as discussed above with regard to step 502. Here, the base station can receive and compile values of $W_n$ broadcast by each other base station $B_n$. In addition, the base station may compute a rate indication for users in its cell. For example, as provided above in Algorithm 2, using $F_m, \{W_n\}_{n \neq m}$, the base station $B_m$ can compute $\overline{sinr}_m^l$, $\forall l$ using equation 13.

At step 506, the base station can maximize a slack variable corresponding to a lower bound of the minimum worst case rate under a power constraint to determine the precoding matrix. For example, as indicated in Algorithm 2, the base station may solve $S_{l,m}(P)$ in (21) to obtain $F_m^*$, where the slack variable a is a lower bound on $\overline{sinr}_m^k$ and where $\|F_m\|_2^2 \leq P_m$. Similar to the process discussed above with regard to Algorithm 1, the base station may iteratively solve a power optimization problem to obtain a value of the slack variable that solves the slack variable maximization problem by determining whether slack variable values result in a predetermined solution of the power optimization problem that is correlated to the solution to the slack variable maximization problem. For example, the base station may solve (21) using the power optimization problem (22) and the predetermined solution (23).

At step 508, the base station can transmit the determined precoding matrix to the other base stations in the network. For example, the base station $B_m$, can broadcast $W_m^* = F_m^*(F_m^*)^H$, as indicated above in Algorithm 2.

At step 510, the base station can determine whether the precoding matrix $F_m^*$ results in a lower minimum receiver rate at one or more of the other base stations. For example, as indicated in Algorithm 2, each other base station $B_n$ can compute $\overline{sinr}_n^{l*}$, $\forall l$ using (13) based on $W_m^*, F_n$ and $\{W_j\}_{j \neq m,n}$, where $F_n$ is determined previously by each base station $B_n$ by performing the initialization as mentioned above with regard to step 504 and $\{W_j\}_{j \neq m,n}$ is obtained as a result of broadcasts performed by other base stations as mentioned above with regard to step 504. Moreover, as provided in Algorithm 2, each base station can determine whether $\min_l\{\overline{sinr}_n^{l*}\} < \min_l\{\overline{sinr}_n^l\}$, where $\overline{sinr}_n^l$ is computed in the same manner discussed above with regard to the determination of $\overline{sinr}_m^l$ in step 504, and, if so, can send an error message to base station $B_m$. In turn, if the base station $B_m$ does not receive an error message, then the base station can presume that its precoder matrix $F_m^*$ does not result in a lower minimum receiver rate at another base station. If the base station $B_m$ does receive an error message, then the base station can set presume that its precoder matrix $F_m^*$ does result in a lower minimum receiver rate at another base station.

If the base station determines that its precoding matrix does not result in a lower minimum receiver rate at one or more base stations, then the method can proceed to step 512 in which the base station can apply the determined precoding matrix to the beamforming signals. For example, the base station $B_m$ can apply $F_m^*$ to the beam forming signals. Thereafter, the method may repeat for another time frame, using $F_m^*$ and any $F_n^*$ selected by other base stations performing the method 500 in lieu of the corresponding preliminary precoders determined in accordance with step 502. It should also be noted that at step 512, the base station $B_m$ can broadcast an update message indicating that $F_m^*$ has been applied by base station $B_m$. In turn, the other base stations $B_n$ can receive the update message and can set $W_m$ to $W_m^*$.

If the base station determines that its precoding matrix results in a lower minimum receiver rate at one or more base stations, then the method can proceed to step 514 in which the base station can apply a current precoding matrix to the beamforming signals. For example, the current precoding matrix may be the precoding matrix $F_m$ that can be determined at step 502. Alternatively, the current precoding matrix may be $F_m^*$ that was selected in a previous iteration of method 500. Thereafter, the method may repeat for another time frame, using the current precoding matrix and any $F_n^*$ or $W_n^*$ selected by other base stations performing the method 500 in lieu of the corresponding preliminary precoders previously determined in accordance with, for example, step 502.

It should be noted that in accordance with exemplary aspects, a variation of Algorithm 2 can be employed. In this variation, instead of fixing $\{1, \ldots, M\}$ as the order of processing, where the order in which the BSs attempt to update their precoders is fixed, as done in Algorithm 2 described above, a greedy approach can be applied. In particular, at each iteration of the process, each BS can compute its precoder, assuming precoders of other BSs to be fixed. Then, in a bidding phase, each BS can broadcast its choice and only the choice which maximizes the network minimum worst-case rate is accepted by all BSs.

Figure 6:
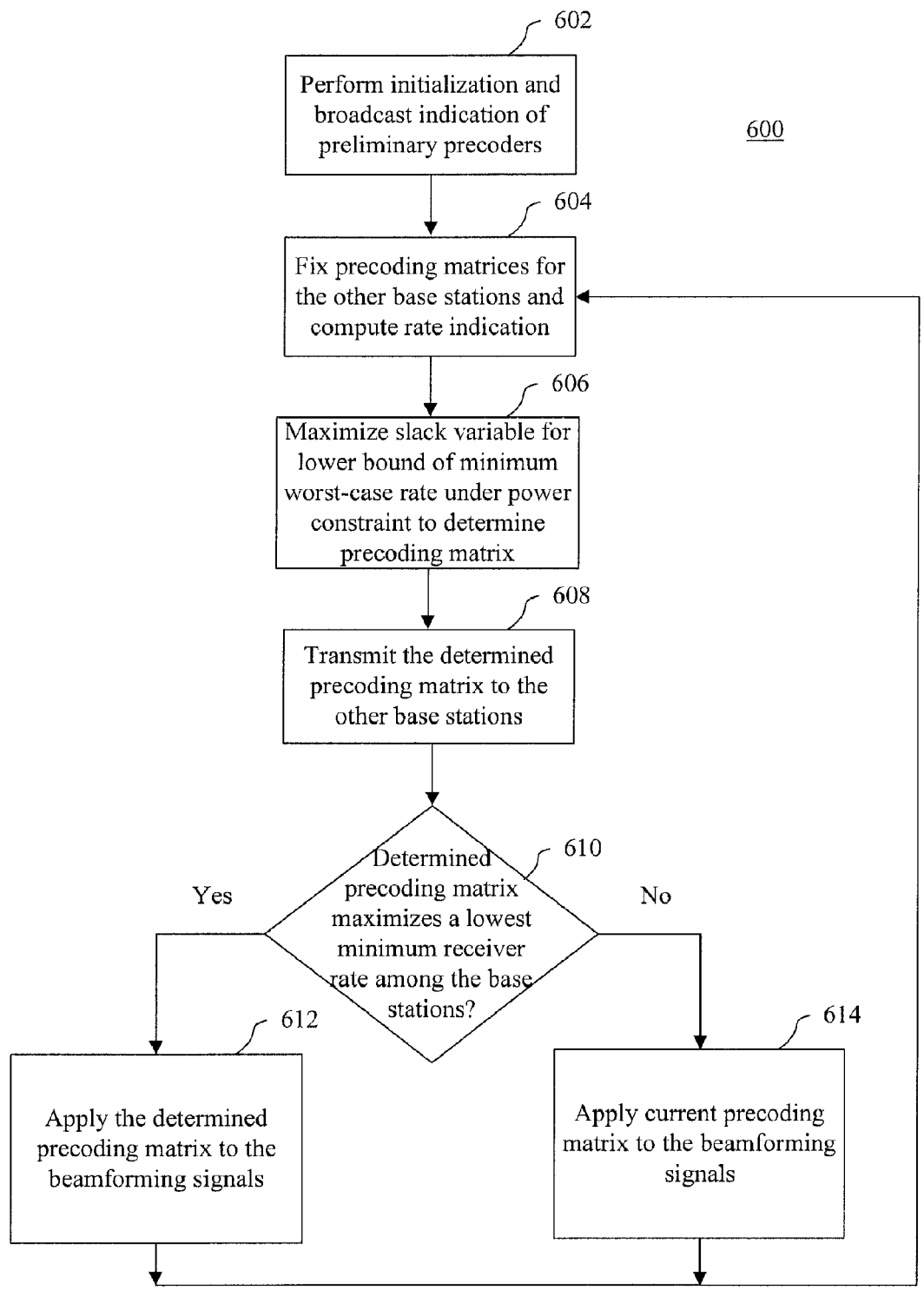
FIG. 6 is a block/flow diagram of an exemplary method for greedily determining precoding matrices in accordance with a robust minimum rate optimization scheme in a limited base station cooperation scenario.

Referring now to FIG. 6 with continuing reference to FIGS. 3 and 5, a base station may determine a precoding matrix at step 304 by implementing a method 600 for greedily determining matrices in a network in which base stations have limited cooperation. Steps 602-608 are identical to corresponding, respective steps 502-508 of method 500 except that the method steps 602-608 are performed simultaneously by each base station in the network (or a subset of base stations in the network).

At step 610, each base station $B_n$ can determine whether its determined precoding matrix, such as $F_n^*$, maximizes a lowest minimum receiver rate among the base stations. For example, each base station $B_m$ may independently determine $\overline{sinr}_n^{l*}$, $\forall l,n$ for each precoding matrix $F_n^*$ received from each base station $B_n$ and for its corresponding precoding matrix $F_{n=m}^*$. Thereafter, using the values of $\overline{sinr}_n^{l*}$, $\forall l,n$, each base station can determine which precoding matrix $F_n^*$ maximizes the network minimum worst-case rate and can apply that precoding matrix in lieu of the corresponding precoding matrix $F_n$ to update its corresponding $\overline{sinr}_m^l$.

If the base station $B_m$ determines that its determined precoding matrix maximizes a lowest minimum receiver rate among the base stations, then the method can proceed to step 612 in which the base station can apply the determined precoding matrix to the beamforming signals. For example, the base station $B_m$ can apply $F_m^*$ to the beam forming signals. Thereafter, the method may repeat for another time frame, using $F_m^*$ and any $F_n^*$ selected by other base stations performing the method 600 in lieu of the corresponding preliminary precoders determined in accordance with step 602.

If the base station determines that its precoding matrix does not maximize a lowest minimum receiver rate among the base stations, then the method can proceed to step 614 in which the base station can apply a current precoding matrix to the beamforming signals. For example, the current precoding matrix may be the precoding matrix $F_m$ that can be determined at step 602. Alternatively, the current precoding matrix may be $F_m^*$ that was selected in a previous iteration of method 600. Thereafter, the method may repeat for another time frame, using the current precoding matrix and any $F_n^*$ selected by other base stations performing the method 600 in lieu of the corresponding preliminary precoders previously determined in accordance with, for example, step 602.

According to other exemplary aspects, another distributed algorithm that can optimally solve the optimization problem in (14) can be employed by base stations. Here, the distributed process may solve the optimization problem in (14) by introducing more auxiliary variables and using dual decomposition. This process involves a higher level of inter-BS signaling than the previous distributed procedures discussed above.

First, (14) can be rewritten as $$\begin{cases} \max_{\{F_m, \beta_{m,n}^k\}, a} a & (24) \\ \text{s.t.} \quad \dfrac{\left|\left(|\tilde{h}_{m,m}^k w_m^k| - \varepsilon_{m,m}^k \|w_m^k\|_2\right)^+\right|^2}{\max\limits_{D_{m,m}^k} h_{m,m}^k Y_{m,k}(Y_{m,k})^H (h_{m,m}^k)^H +} \geq a \forall m, k, \\ \qquad\qquad\qquad \sum\limits_{n \neq m}(\beta_{m,n}^k)^2 + 1 \\ \|F_m\|_2^2 \leq P_m \forall m \\ \max\limits_{D_{m,n}^k} h_{m,n}^k F_n(F_n)^H (h_{m,n}^k)^H \leq (\beta_{m,n}^k)^2 \forall k, m \neq n \end{cases}$$

To solve (24), a bi-section search over a can be employed in which for any fixed a, the following problem can be solved $$\begin{cases} \min_{\{F_m, \beta_{m,n}^k\}} \sum\limits_m \|F_m\|_2^2 & (25) \\ \text{s.t.} \quad \dfrac{\left|\left(|\tilde{h}_{m,m}^k w_m^k| - \varepsilon_{m,m}^k \|w_m^k\|_2\right)^+\right|^2}{\max\limits_{D_{m,m}^k} h_{m,m}^k Y_{m,k}(Y_{m,k})^H (h_{m,m}^k)^H +} \geq a \forall m, k, \\ \qquad\qquad\qquad \sum\limits_{n \neq m}(\beta_{m,n}^k)^2 + 1 \\ \|F_m\|_2^2 \leq P_m \forall m \\ \max\limits_{D_{m,n}^k} h_{m,n}^k F_n(F_n)^H (h_{m,n}^k)^H \leq (\beta_{m,n}^k)^2 \forall m \neq n, k. \end{cases}$$

Thus, returning to FIG. 3, precoding matrices may be determined by maximizing a slack variable at step 310, in which the slack variable is given by in a (24). In turn, step 310 can be implemented by iteratively minimizing, at step 350, a sum of norms of precoding matrices using fixed values of the slack variable in accordance with, for example, (25). In addition, step 350 can be performed by a base station using a dual composition approach.

For example, for each BS m, variables $\beta_{m,n}^{k,m}, \beta_{n,m}^{j,m}$ which denote its copies of $\beta_{m,n}^k, \beta_{n,m}^j$, respectively, can be defined. Also, let $b^{(m)}$ be the vector formed by collecting all such variables. Then, (25) can be written as $$\begin{cases} \min_{\{F_m, b^{(m)}\}} \sum\limits_m \|F_m\|_2^2 & (26) \\ \text{s.t.} \quad \dfrac{\left|\left(|\tilde{h}_{m,m}^k w_m^k| - \varepsilon_{m,m}^k \|w_m^k\|_2\right)^+\right|^2}{\max\limits_{D_{m,m}^k} h_{m,m}^k Y_{m,k}(Y_{m,k})^H (h_{m,m}^k)^H +} \geq a \forall m, k, \\ \qquad\qquad\qquad \sum\limits_{n \neq m}(\beta_{m,n}^k)^2 + 1 \\ \max\limits_{D_{n,m}^j} h_{n,m}^j F_m(F_m)^H (h_{n,m}^j)^H \leq (\beta_{n,m}^{j,m})^2 \forall j, n \neq m \\ \|F_m\|_2^2 \leq P_m \forall m \\ \beta_{m,n}^{k,m} = \beta_{m,n}^{k,n} \forall k, m \neq n. \end{cases}$$

Similar to the proof of Theorem 4, it can be shown that (26) is equivalent to a (convex) SDP and thus strong duality holds for (26) provided Slater's condition is also satisfied. Thus, dual variables $\{\lambda_{m,n}^k\}$ can be defined and I can denote the vector formed by collecting all such variables. The following partial Lagrangian is considered $$L(\{F_m, b^{(m)}\}, l) \triangleq \sum_m \|F_m\|_2^2 + \sum_{m \neq n} \sum_k \lambda_{m,n}^k (\beta_{m,n}^{k,m} - \beta_{m,n}^{k,n}) \quad (27)$$

and the dual function $$g(l) \triangleq \begin{cases} \min_{\{F_m, b^{(m)}\}} \sum\limits_m \|F_m\|_2^2 + \sum\limits_{m \neq n} \sum\limits_k \lambda_{m,n}^k (\beta_{m,n}^{k,m} - \beta_{m,n}^{k,n}) & (28) \\ \text{s.t.} \quad \dfrac{\left|\left(|\tilde{h}_{m,m}^k w_m^k| - \varepsilon_{m,m}^k \|w_m^k\|_2\right)^+\right|^2}{\max\limits_{D_{m,m}^k} h_{m,m}^k Y_{m,k}(Y_{m,k})^H (h_{m,m}^k)^H +} \geq a \forall m, k, \\ \qquad\qquad\qquad \sum\limits_{n \neq m}(\beta_{m,n}^k)^2 + 1 \\ \max\limits_{D_{n,m}^j} h_{n,m}^j F_m(F_m)^H (h_{n,m}^j)^H \leq (\beta_{n,m}^{j,m})^2 \forall j, n \neq m \\ \|F_m\|_2^2 \leq P_m \forall m \end{cases}$$

The dual problem splits into M smaller problems of the form $$\begin{cases} \min_{\{F_m, b^{(m)}\}} \|F_m\|_2^2 + \sum\limits_{n: n \neq m}\left(\sum\limits_k \lambda_{m,n}^k \beta_{m,n}^{k,m} - \sum\limits_j \lambda_{n,m}^j \beta_{n,m}^{j,m}\right) & (29) \\ \text{s.t.} \quad \dfrac{\left|\left(|\tilde{h}_{m,m}^k w_m^k| - \varepsilon_{m,m}^k \|w_m^k\|_2\right)^+\right|^2}{\max\limits_{D_{m,m}^k} h_{m,m}^k Y_{m,k}(Y_{m,k})^H (h_{m,m}^k)^H +} \geq a \forall k, \\ \qquad\qquad\qquad \sum\limits_{n \neq m}(\beta_{m,n}^{k,m})^2 + 1 \\ \max\limits_{D_{n,m}^j} h_{n,m}^j F_m(F_m)^H (h_{n,m}^j)^H \leq (\beta_{n,m}^{j,m})^2 \forall j, n : n \neq m \\ \|F_m\|_2^2 \leq P_m. \end{cases}$$

Using the arguments provided in the preceding sections, each of the smaller problems in (29) can be shown to be equivalent to an SDP. Invoking the strong duality, the primal optimal solution can be recovered by solving the dual problem $\max_I\{g(I)\}$. The latter problem can be also solved in a distributed manner via the sub-gradient method. In particular, suppose $\{\hat{b}^{(m)}\}$ are the optimized variables obtained upon solving the decoupled optimization problems in (29). Then the dual variables can be updated using a sub-gradient as $\lambda_{m,n}^k \rightarrow \lambda_{m,n}^k + \mu(\hat{\beta}_{m,n}^{k,m} - \hat{\beta}_{m,n}^{k,n})$, $\forall k, m \neq n$, where $\mu$ is a positive step size parameter. Updating $\lambda_{m,n}^k$ involves exchanging $\hat{\beta}_{m,n}^{k,m}, \hat{\beta}_{m,n}^{k,n}$ between BSs m,n, respectively. Finally, it should be noted that a speed-up can be obtained at the cost of some sub-optimality by forcing equality after a few steps of the sub-gradient method. In particular, both $\beta_{m,n}^{k,m}, \beta_{m,n}^{k,n}$ can be set to be equal to $$\frac{\hat{\beta}_{m,n}^{k,m} + \hat{\beta}_{m,n}^{k,n}}{2}$$

for all k,m≠n and then the M decoupled problems in (26) can be concurrently optimized over $\{F_m\}$. The current choice of a can be declared feasible if and only if all of the problems are feasible.

Robust Weighted Sum-Rate Optimization

Figure 7:
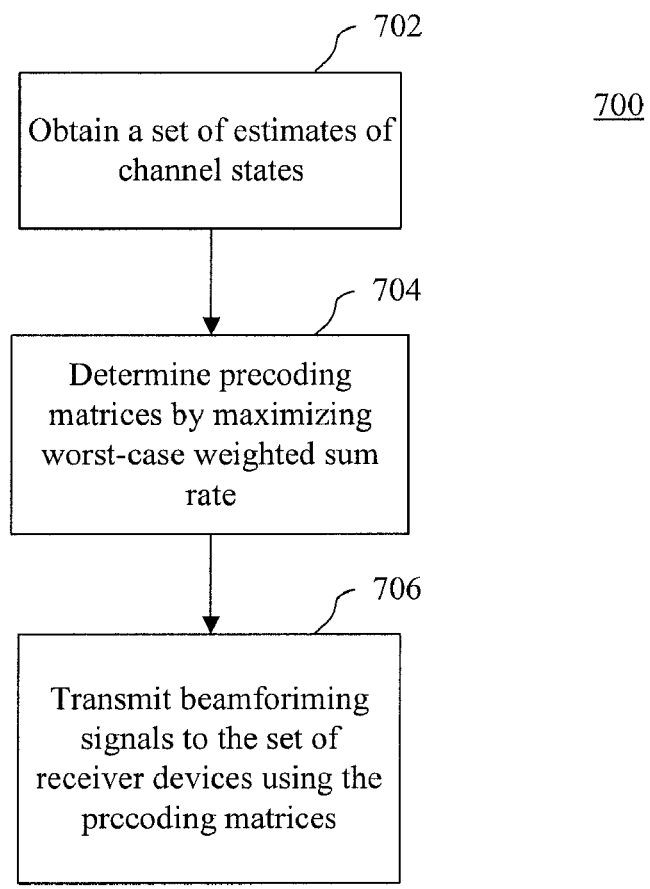
FIG. 7 is a block/flow diagram of an exemplary method for optimizing the utility of receiver devices in a wireless communication network by maximizing a worst-case weighted sum-rate.

Referring now to FIG. 7 with continuing reference to FIGS. 1-3, an exemplary method 700 for optimizing the utility of receiver devices in a wireless communication system is illustrated. Here, the method 700 generally implements a robust weighted sum-rate optimization and can be performed in a variety of ways, as discussed further herein below. Similar to method 300, method 700 can be performed by a base station 102, 202 or a control center if full cooperation between base stations is feasible. Alternatively, if only limited cooperation is feasible, then the method can be performed independently by each base station, as discussed further herein below.

The method 700 may begin at step 702 in which a base station or a control center may obtain a set of estimates of channel states corresponding to channels received by a set of receiver devices. These estimates can be received in the form of feedback from the receiver devices. The feedback from each receiver device can be limited to a few bits. Thus, each receiver device may have to quantize each one of the channel estimates available to it. Consequently, the base station or control center has access to channel estimates that can be corrupted by quantization errors. As indicated above, the channel state information may correspond to $\{h_{m,n}^k\}_{n=1}^M$, which includes the channel $h_{m,m}^k$ received by the receiver from the base station $B_m$ servicing the receiver in addition to the channels $h_{m,n}^k$ (n≠m) received by the receiver from base stations $B_n$ servicing cells other than cell m. In a fully cooperative scenario, each base station may communicate the respective channel state information for receivers or users in the corresponding cell to the other base stations in the network or to a control center. Alternatively, in a limited cooperation scenario, while each base station can estimate channel information $\{h_{m,n}^k\}_{n=1}^M$ for receivers in its own cell, each base station can communicate prospective precoding matrices and equalizer matrices to other bases to optimize receiver utility in the network, as discussed in more detail herein below.

At step 704, a base station or control center can determine a precoding matrix for the set of receiver devices by maximizing a worst-case weighted sum rate of the network. For example, as discussed above with regard to equation (7), the precoding matrices $\{F_m\}$ for the base stations in the network can be determined in accordance with a power budget by solving the following:

$$R(P) \triangleq \begin{cases} \max_{\{F_m\}} \min_{\{D_{m,n}^k\}} \sum_{m=1}^M \sum_{k=1}^K \alpha_m^k R_m^k \\ \text{s.t. } \|F_m\|_2^2 \leq P_m \forall m. \end{cases}$$

Here the term $$\min_{\{D_{m,n}^k\}} \sum_{m=1}^M \sum_{k=1}^K \alpha_m^k R_m^k$$

is an example of the minimum receiver weighted sum-rate which is within a set of rates corresponding to a bounded set of channel estimation errors $\{D_{m,n}^k\}$. The weights $\alpha_m^k$ can be employed to implement a user-priority scheme, where the rates $R_m^k$ of users $U_m^k$ with a higher priority are given higher corresponding weights $\alpha_m^k$. Furthermore, the estimate can be determined by considering a set of channels $\{h_{m,n}^k\}_{n=1}^M$ including channels $h_{m,n}^k$ (n≠m) received by the set of receiver devices from base stations $B_n$ (n≠m) other than a base station $B_m$ servicing the set of receiver devices. For example, as noted below with respect to various exemplary embodiments, $\{h_{m,n}^k\}_{n=1}^M$ can be used to determine values of $\tilde{MSE}_m^k$ to solve equation (7).

At step 706, each base station can transmit beamforming signals generated in accordance with the determined precoding matrix to their own respective receiver devices in their respective cell.

It should be noted that, at step 704, in the full cooperation scenario, a control center can determine precoding matrices for each base station using channel state information for receivers in each cell serviced by the base stations and can assign the precoding matrices to the base stations to enable them to generate optimized, beamforming signals for transmission to the receiver. Alternatively, in the full cooperation scenario, each base station may independently determine their own precoding matrix using the same methods, where each base station can receive channel state information from other base stations, determine the precoding matrices for the entire network and apply a corresponding precoding matrix for its own beamforming signals. In addition, one or more base stations can implement step 704 by solving equation (7) via MSE optimization. Exemplary embodiments that solve (7) using MSE optimization in a full cooperation scenario and a limited cooperation scenario are described herein below.

Full Cooperation

By recalling the definitions in (5) and taking into account that the uncertainty regions corresponding to $SINR_m^k$ and $SINR_n^l$ for m≠n or l≠k are disjoint, finding the worst-case SINR for each user can be carried out independently of the rest. Hence, by recalling that the worst-case SINR of user $U_m^k$ is denoted by $sinr_m^k$, the problem R(P) in (7) is given by $$R(P) = \begin{cases} \max_{\{F_m\}} \sum_{m=1}^M \sum_{k=1}^K \alpha_m^k \log(1 + sinr_m^k) \\ \text{s.t. } \|F_m\|_2^2 \leq P_m \forall m \end{cases} \quad (30)$$

The problem R(P) as posed above, is not a convex problem. Optimal precoder design based on maximizing the weighted sum-rate even when the BSs have perfect CSI is intractable. To the best of the knowledge of the inventors, even in this case only techniques yielding locally optimal solutions can be used. According to exemplary aspects of the present invention, a suboptimal solution can be found by obtaining a conservative approximation of the problem R(P). This approximation provides a lower bound on R(P).

To start the set of functions $\{S_m^k(u): R \to R\}$ is defined as $$S_m^k(u) \triangleq \alpha_m^k u - \frac{\alpha_m^k}{1 + \sin r_m^k} \exp(u - 1),$$

for $m = 1, \ldots, M, k = 1, \ldots, K$, and $u \in R$.

It can be readily verified that $$\max_{u \in R} S_m^k(u) = \alpha_m^k \log(1 + \sin r_m^k)$$

and $$u^* = \arg\max_{u \in R} S_m^k(u) = \log(1 + \sin r_m^k) + 1 \, \forall \, k, m. \quad (31)$$

Therefore, by incorporating the slack variables $u = [u_m^k]$ and substituting the objective function of R(P) with its equivalent term $$\sum_{m=1}^{M} \sum_{k=1}^{K} \max_{u_m^k} S_m^k(u_m^k),$$

the problem R(P) is equivalently given by $$R(P) = \begin{cases} \max_{\{F_m\}, u} \sum_{m=1}^{M} \sum_{k=1}^{K} \alpha_m^k u_m^k - \frac{\alpha_m^k}{1 + \sin r_m^k} \exp(u_m^k - 1) \\ \text{s.t. } \|F_m\|_2^2 \leq P_m \forall \, m \end{cases} \quad (32)$$

For any fixed u the intermediate problem $\tilde{R}(P, u)$ is defined, where $\tilde{R}(P, u)$ yields the optimal precoders $\{F_m\}$ corresponding to the given u and power budget P. Since for a given u the term $\Sigma_m \Sigma_k \alpha_m^k u_m^k$ becomes a constant, the following is obtained $$\tilde{R}(P, u) \triangleq \begin{cases} \min_{\{F_m\}} \sum_{m=1}^{M} \sum_{k=1}^{K} \frac{\alpha_m^k}{1 + \sin r_m^k} \exp(u_m^k - 1) \\ \text{s.t. } \|F_m\|_2^2 \leq P_m \forall \, m \end{cases} \quad (33)$$

The problem $\tilde{R}(P, u)$ can now be transformed into a weighted sum of the worst-case MSEs as follows, $$\tilde{R}(P, u) \triangleq \begin{cases} \min_{\{F_m\}} \sum_{m=1}^{M} \sum_{k=1}^{K} \alpha_m^k \exp(u_m^k - 1) \max_{\{D_{m,n}^k\}} \min_{f_m^k} M\tilde{S}E_m^k \\ \text{s.t. } \|F_m\|_2^2 \leq P_m \forall \, m \end{cases} \quad (34)$$

Next, for any given u an upper bound on $\tilde{R}(P, u)$ can be found, where, by recalling (32) and (34), the upper bound on $\tilde{R}(P, u)$ is a lower bound on R(P). By invoking the inequality in (19) and defining $f_m = [f_m^k]_k$, an upper bound on $\tilde{R}(P, u)$ can be found as follows, $$\bar{R}(P, u) \triangleq \begin{cases} \min_{\{F_m, f_m\}} \sum_{m=1}^{M} \sum_{k=1}^{K} \alpha_m^k \exp(u_m^k - 1) \max_{\{D_{m,n}^k\}} M\tilde{S}E_m^k \\ \text{s.t. } \|F_m\|_2^2 \leq P_m \forall \, m \end{cases} \quad (35)$$

$\bar{R}(P, u)$ can itself be sub-optimally solved by using the alternating optimization (AO) principle and optimizing $\{f_m\}$ and $\{F_m\}$ in an alternating manner. By deploying AO $\{F_m\}$ can be optimized while keeping $\{f_m\}$ fixed and vice versa. Since the objective is bounded and it decreases monotonically at each iteration, the AO procedure is guaranteed to converge. In the following theorem it is shown that solving $\bar{R}(P, u)$ at each step of the AO procedure is a convex problem with a computationally efficient solution.

Theorem 6 For arbitrarily fixed $\{F_m\}$, the problem $\bar{R}(P, u)$ can be optimized over $\{f_m\}$ efficiently as an SDP. Similarly, for arbitrarily fixed $\{f_m\}$, the problem $\bar{R}(P, u)$ can be optimized over $\{F_m\}$ efficiently as another SDP.

The proof of Theorem 6 is as follows. It is first shown that for any given and fixed $\{f_m^k\}$, the problem $\bar{R}(P, u)$ is equivalent to an SDP. $q_m^k$ is defined as $q_m^k = \alpha_m^k \exp(u_m^k - 1)/|f_m^k|^2$. Accordingly, $$\sum_{m=1}^{M} \sum_{k=1}^{K} \alpha_m^k \exp(u_m^k - 1) M\tilde{S}E_m^k =$$

$$\sum_{m=1}^{M} \sum_{k=1}^{K} \underbrace{\left( q_m^k |h_{m,m}^k w_m^k - f_m^k|^2 + \sum_{l \neq k} q_m^l |h_{m,m}^l w_m^l|^2 + \sum_{n \neq m} \sum_{l} q_n^l |h_{n,m}^l w_m^l|^2 \right)}_{\equiv g(w_m^k)}$$

Clearly, the optimization of $\bar{R}(P, u)$ now decouples into M optimization problems of the form $$\begin{cases} \min_{F_m, b_m} b_m \\ \text{s.t. } \max_{\{D_{n,m}^i\}} \sum_{k=1}^{K} g(w_m^k) \leq b_m \\ \|F_m\|_2^2 \leq P_m \forall \, m. \end{cases} \quad (36)$$

It can be verified that the constraints can be equivalently expressed as finitely many Linear Matrix Inequalities (LMIs) so that the optimization problem is equivalent to an SDP. Next, suppose $\{F_m\}$ are arbitrarily fixed. Then $\bar{R}(P, u)$ reduces to $$\min_{\{f_m^k\}} \sum_{m=1}^{M} \sum_{k=1}^{K} \alpha_m^k \exp(u_m^k - 1) \max_{\{D_{m,n}^k\}} M\tilde{S}E_m^k$$

The above optimization problem decouples into KM smaller problems of the form $$\min_{\{f_m^k\}} \max_{\{D_{m,n}^k\}} M\tilde{S}E_m^k \quad (37)$$

Substituting $g_m^k = 1/f_m^k$ in (37), the optimization can instead be performed over $g_m^k$ and the latter optimization problem can be readily shown to be equivalent to an SDP.

TABLE 3

Algorithm 3 - Robust Weighted Sum-rate Optimization

1: Input P and $\{\tilde{h}_{m,n}^k, \epsilon_{m,n}^k\}$
2: Initialize $F_m, f_m$ for all m and u
3: Repeat
4: Solve $\bar{R}(P,u)$ by optimizing over $\{F_m\}$ and $\{f_m^k\}$ in an alternating manner;
5: Update $u_m^k \leftarrow 1 - \log(\max \{D_{m,n}^k\} \tilde{MSE}_m^k), \forall k, m$
6: until convergence
7: Output $\{F_m\}$ Algorithm 3 provided in Table 3 above summarizes steps that can be employed for sub-optimally solving R(P). Algorithm 3 is constructed based on the connection between the objective functions of R(P) and $\bar{R}(P,u)$. At each iteration of Algorithm 3 for a fixed u, $\bar{R}(P,u)$ is solved by using the AO principle as discussed above and a new set of precoders and equalizers is obtained. The minimum rate achieved by using this set of precoders and equalizers provides a lower bound on R(P). This set of precoders and equalizers is also deployed for computing the worst-case MSEs and updating u as $u_m^k = 1 - \log(\max_{\{D_{m,n}^k\}} \tilde{MSE}_m^k)$, $\forall k, m$. It should be noted that the worst-case MSEs can be computed using the techniques described above with respect to the proof of Theorem 5.

Since R(P) is bounded from above, so is any lower bound on it. Therefore, the utility function of Algorithm 3 is bounded and increases monotonically in each iteration. Thus, convergence of Algorithm 3 is guaranteed.

Figure 8:
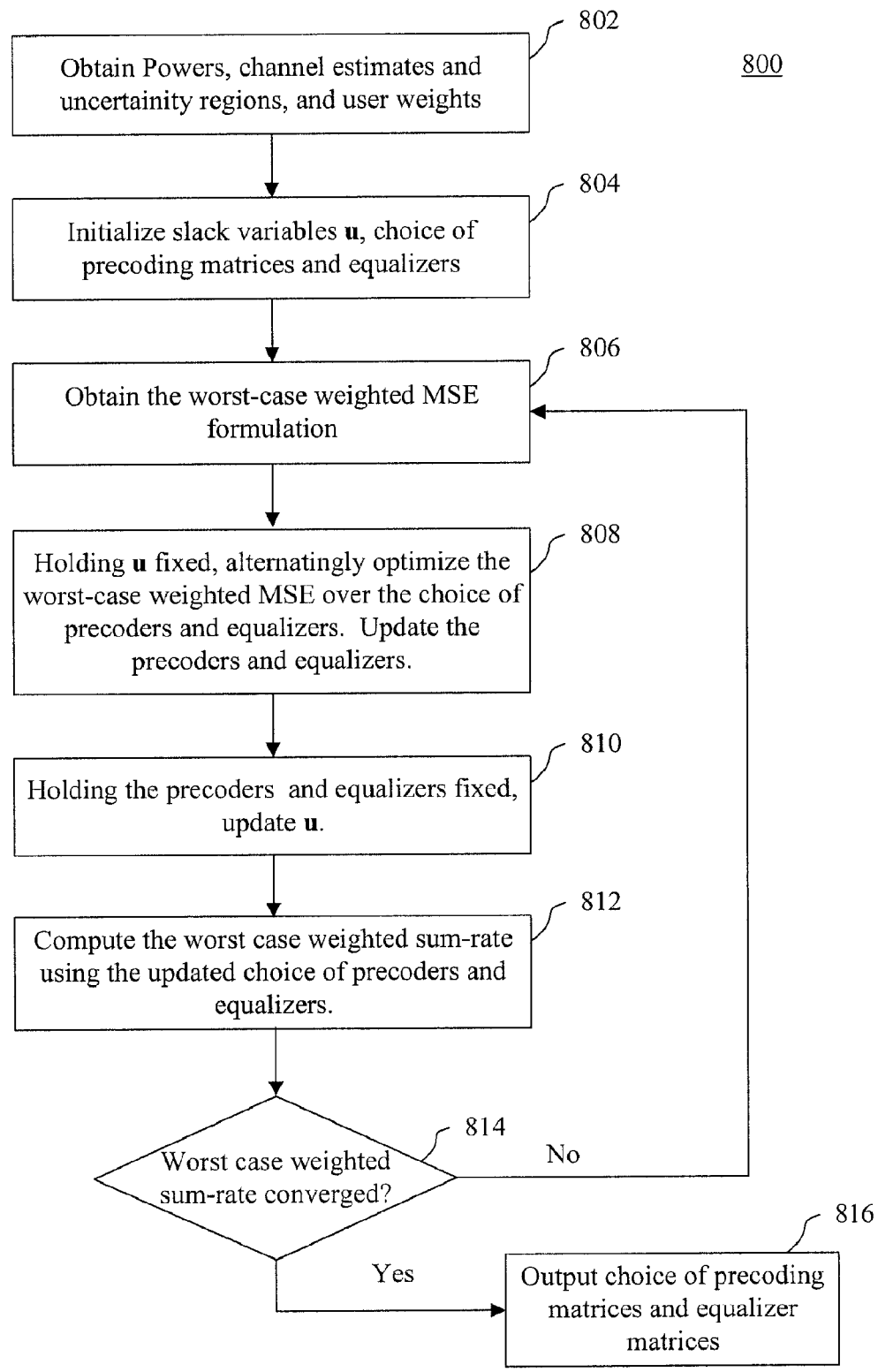
FIG. 8 is a block/flow diagram of an exemplary method for determining precoding matrices in accordance with a robust weighted sum-rate optimization scheme.

With reference now to FIG. 8 with continuing reference to FIG. 7, an exemplary method 800 for determining precoding matrices and equalizers that optimize the utility of receivers in a wireless communication network in accordance with an exemplary embodiment is illustrated. Algorithm 3 can be employed in the method 800 to determine the precoders and the equalizers. Further, the method 800 can be performed by one or more base stations, including a control center, and can be performed to implement step 704 of the method 700. Alternatively, each base station may implement a distributed variation of the method 800, as discussed further herein below.

Method 800 can begin at step 802, in which a base station may obtain powers P, channel estimates $\tilde{h}_{m,n}^k$, uncertainty regions $\epsilon_{m,n}^k$ and user-weights $\alpha_m^k$. The values of these parameters can be communicated between the base stations.

At step 804, the base station can initialize the slack variables u, the choice of precoding matrices $F_m$ and the equalizers $f_m$ for all m base stations using the variables obtained at step 802.

At step 806, the base station may obtain the worst-case weighted MSE formulation. For example, the base station may obtain the formulation (35).

At step 808, the base station can iteratively solve the formulation over a set of precoding matrices and a set of equalizers by alternately optimizing the formulation for the set of precoding matrices with a fixed equalizer matrix and optimizing the formulation for the set of equalizer matrices with a fixed precoding matrix until convergence of the formulation to obtain a new set of optimal precoding matrices and a new set optimal equalizer matrices for the base stations. For example, holding u fixed, the base station may solve or optimize $\bar{R}(P,u)$ over the set of precoding matrices $\{F_m\}$ and the equalizers $\{f_m\}$ in an alternating manner by solving corresponding SDPs until the formulation converges. The new precoding matrices $\{F_m\}$ and the equalizers $\{f_m\}$ can be obtained to update the slack variables and to determine whether the formulation has converged to the maximum MSE.

At step 810, the base station may update the slack variables with the precoding matrices and new equalizers. For example, the base station may update the slack variables u by setting the precoders and equalizers to the new precoding matrices and new equalizers and holding them fixed. The slack variable may be updated by using the closed from expression, where $u_m^k$ can be set to $1 - \log(\max_{\{D_{m,n}^k\}} \tilde{MSE}_m^k)$ for all m, k.

At step 812, the base station may compute the worst-case weighted sum rate with the new sets of precoding matrixes and equalizer matrices. For example, as indicated above, the procedure set forth in the proof of Theorem 5 can be employed to find the worst-case weighted sum rate.

At step 814, the base station can determine whether the worst case rated sum-rate has converged. If the worst-case rated sum-rate has converged, then the method may proceed to step 806 and repeat. Otherwise the method may proceed to step 816, in which the base station can output the choice of precoding matrices $\{F_m\}$ and equalizer matrices $\{f_m\}$ that lead to the convergence of the worst-case rated sum rate.

In accordance with an exemplary embodiment, a control center can distribute the precoding matrices $\{F_m\}$ and equalizers $\{f_m\}$ to the corresponding base stations, each of which may apply its respective precoding matrix $F_m$ and equalizer $f_m$ to generate beamforming signals for transmission to its set of receiver devices. For example, each base station may apply its precoding matrix $F_m$ and equalizer $f_m$ to generate beamforming signals for transmission in step 706 of method 700.

Distributed Implementation

An advantage of the AO based approach employed to sub-optimally solve R(P) in the previous section is that it is amenable to a distributed implementation. In particular, it should be noted that for fixed u, $\{f_m\}$, the optimization over $\{F_m\}$ decouples into M smaller problems (36) that can be solved concurrently by the M BSs. Similarly, for fixed u, $\{F_m\}$, the optimization over $\{f_m\}$ decouples into KM smaller problems (37) that can be solved concurrently. Finally, for a given $\{F_m, f_m\}$ the elements of u can also be updated concurrently. Consequently, Algorithm 3 and method 800 can indeed be implemented in a distributed fashion with appropriate information exchange among the BSs.

For example, similar to methods 500 and 600 of FIGS. 5 and 6, respectively, each base station m may successively determine its corresponding precoding matrix and equalizers using Algorithm 3 or method 800 by employing a fixed set of channel estimations and a fixed set of equalizers for base stations n≠m. For example, each base station m can receive channels $\{h_{n,m}^l\}$ and/or precoding matrices $\{F_{n\neq m}\}$ and $\{f_n^l\}$ from the other base stations in step 802 and may optimize its precoding matrices $F_m$ and equalizers $f_m$ in an alternating manner using (36) and (37) respectively by holding $f_m$ and $F_m$ fixed respectively, and holding u fixed as discussed above with regard to step 808. Thereafter, as discussed above with respect to step 810, the base station m can update u using the closed form expression. Subsequently, the base station m can iteratively determine the precoding matrices $F_m$ and equalizers $f_m$ using alternating optimization and can update the slack variable u until the worst-cast weighted sum rate has converged, as discussed above with regard to steps 812 and 814 of method 800.

In addition, after obtaining the optimized precoding matrices $F_m$ and equalizers $f_m$, similar to method 500 of FIG. 5, the base station m can determine whether the optimized precoding matrices $F_m$ and equalizers $f_m$ result in a higher MSE at any of the other base stations by broadcasting of the precoding matrices $F_m$ and equalizers $f_m$ and by employing error messages. In addition, the base station can apply the optimized precoding matrices $F_m$ and equalizers $f_m$ in step 706 to transmit beamforming signals to its set of receivers if the optimized precoding matrices and equalizers do not result in a higher MSE at any of the other base stations.

In an alternative implementation, after obtaining the optimized precoding matrices $F_m$ and equalizers $f_m$, similar to method 600 of FIG. 6, the base stations may update the precoders and matrices in a greedy manner using a bidding procedure. For example, similar to step 608, each base station may transmit its corresponding optimized precoding matrices and equalizers to each other base station and the base stations may determine that only the precoding matrix $F_m$ and equalizers $f_m$ resulting in a lowest network-wide MSE will be applied. Thus, the corresponding base station m can apply the precoding matrix $F_m$ and equalizers $f_m$ to transmit beamforming signals to its receivers while the remaining base stations $n \neq m$ can update its values of the precoders and equalizers employed at base station m. The process may thereafter be repeated for a following time frame.

SLIR Optimization

Another adequate albeit sub-optimal approach for selecting the beamforming vectors considers the worst-case signal-to-leakage-interference-plus-noise ratio (SLINR) can be employed. The SLINR metric has been shown to be an effective metric over networks with perfect CSI. In particular, the worst-case SLINR corresponding to user k in cell m is given by, $$slinr_m^k \triangleq \max_{\{D_{m,n}^k\}} \frac{|h_{m,m}^k w_m^k|^2}{\sum_{j \neq k} |h_{m,m}^j w_m^k|^2 + \sum_{n \neq m} \sum_l |h_{n,m}^l w_m^k|^2 + 1} \quad (38)$$

The uncertainty regions in the numerator and denominator are decoupled so that $$slinr_m^k = \frac{\min_{\{D_{m,n}^k\}} |h_{m,m}^k w_m^k|^2}{\sum_{j \neq k} \max_{\{D_{m,n}^j\}} |h_{m,m}^j w_m^k|^2 + \sum_{n \neq m} \sum_l \max_{\{D_{n,m}^l\}} |h_{n,m}^l w_m^k|^2 + 1} \quad (39)$$

If a per-user power profile $\{P_m^k\}$ has been given, then the beamforming vectors can be independently designed by solving $$\begin{cases} \max_{w_m^k} slinr_m^k \\ \text{s.t.} \ \|w_m^k\|_2^2 \leq P_m^k \ \forall \ k, m. \end{cases} \quad (40)$$

The maximization problem in (40) can be exactly solved by alternatively solving a power optimization problem in conjunction with a linear bi-section search as described in (14) and (15).

Exemplary embodiments of the present invention discussed herein above provide improved precoder designs that optimize user-rates by accurately accounting for inter-cell interference and intra-cell interference. By considering channel states and corresponding uncertainty regions of interference channels received by users, the precoders of exemplary embodiments can guarantee minimum utility levels for all possible errors in the uncertainty regions.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. In a wireless communications system including:
   a first set of one or more mobile stations;
   a first base station that serves the first set of mobile stations; and
   a second base station coordinated with the first base station,
   a method implemented in the first base station, the method comprising:
   receiving from each of the first set of mobile stations a first indication of first channel state information corresponding to the first base station and a second indication of second channel state information corresponding to the second base station.

2. The method of claim 1, further comprising:
   deciding a precoder according to the first and second indications received from the first set of mobile stations.

3. The method of claim 1, further comprising:
receiving from each of a second set of mobile stations a third indication of third channel state information corresponding to the first base station and a fourth indication of fourth channel state information corresponding to the second base station.

4. The method of claim 3, further comprising:
deciding a precoder according to the first and second indications received from the first set of mobile stations and the third and fourth indications received from the second set of mobile stations.

5. The method of claim 1,
wherein at least one of the first channel state information and the second channel state information comprises a channel estimate.

6. The method of claim 1,
wherein at least one of the first channel state information and the second channel state information is quantized at each of the first set of mobile stations.

7. The method of claim 3,
wherein at least one of the third channel state information and the fourth channel state information comprises a channel estimate.

8. The method of claim 3,
wherein at least one of the third channel state information and the fourth channel state information is quantized at each of the second set of mobile stations.

9. A base station used in a wireless communications system including a first set of one or more mobile stations and another base station coordinated with the base station, the base station comprising:
a first receiving unit to receive from each of the first set of mobile stations a first indication of first channel state information corresponding to the base station and said a second indication of second channel state information corresponding to said another base station,
wherein the base station serves the first set of mobile stations.

10. The base station of claim 9, further comprising:
a first decision unit to decide a precoder according to the first and second indications received from the first set of mobile stations.

11. The base station of claim 9, further comprising:
a second receiving unit to receive from each of a second set of mobile stations a third indication of third channel state information corresponding to the base station and a fourth indication of fourth channel state information corresponding to said another base station.

12. The base station of claim 11, further comprising:
a second decision unit to decide a precoder according to the first and second indications received from the first set of mobile stations and the third and fourth indications received from the second set of mobile stations.

13. The base station of claim 9,
wherein at least one of the first channel state information and the second channel state information comprises a channel estimate.

14. The base station of claim 9,
wherein at least one of the first channel state information and the second channel state information is quantized at each of the first set of mobile stations.

15. The base station of claim 11,
wherein at least one of the third channel state information and the fourth channel state information comprises a channel estimate.

16. The base station of claim 11,
wherein at least one of the third channel state information and the fourth channel state information is quantized at each of the second set of mobile stations.

17. A mobile station used in a wireless communications system including a first base station, and a second base station coordinated with the first base station, the mobile station comprising:
an obtaining unit to obtain first channel state information corresponding to the first base station serving the mobile station and second channel state information corresponding to the second base station; and
a transmitting unit to transmit to the first base station a first indication of the first channel state information and a second indication of the second channel state information,
wherein the first base station serves a first set of one or more mobile stations including the mobile station.

18. The mobile station of claim 17,
wherein the first base station decides a precoder according to the first and second indications received from the mobile station.

19. The mobile station of claim 17,
wherein at least one of the first channel state information and the second channel state information comprises a channel estimate.

20. The mobile station of claim 17, further comprising:
a quantizing unit to quantize at least one of the first channel state information and the second channel state information.

* * * * *